US008855277B2

(12) United States Patent
Binder

(10) Patent No.: US 8,855,277 B2
(45) Date of Patent: *Oct. 7, 2014

(54) TELEPHONE OUTLET FOR IMPLEMENTING A LOCAL AREA NETWORK OVER TELEPHONE LINES AND A LOCAL AREA NETWORK USING SUCH OUTLETS

(71) Applicant: MOSAID Technologies Incorporated, Ottawa (CA)

(72) Inventor: Yehuda Binder, Hod Hasharon (IL)

(73) Assignee: Conversant Intellectual Property Managment Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,825

(22) Filed: Jan. 28, 2013

(65) Prior Publication Data

US 2013/0137296 A1 May 30, 2013

Related U.S. Application Data

(63) Continuation of application No. 12/727,375, filed on Mar. 19, 2010, now Pat. No. 8,363,797, which is a continuation of application No. 11/434,927, filed on May 17, 2006, now Pat. No. 7,715,534, which is a continuation of application No. 10/827,349, filed on Apr. 20, 2004, now Pat. No. 7,123,701, which is a continuation of application No. 10/412,251, filed on Apr. 14, 2003, now Pat. No. 6,757,368, which is a continuation of application No. 09/531,692, filed on Mar. 20, 2000, now Pat. No. 6,549,616.

(51) Int. Cl.
*H04M 11/00* (2006.01)
*H04M 11/06* (2006.01)
*H04M 7/00* (2006.01)
*H04L 12/28* (2006.01)

(52) U.S. Cl.
CPC ....... *H04M 7/0003* (2013.01); *H04L 2012/285* (2013.01); *H04L 12/2803* (2013.01); *H04M 11/062* (2013.01); *H04L 2012/2845* (2013.01); *H04L 12/2838* (2013.01); *H04L 2012/2843* (2013.01)
USPC ..................................................... 379/90.01

(58) Field of Classification Search
USPC .......... 379/90.01, 93.01, 93.05, 93.06, 93.28, 379/93.36
See application file for complete search history.

(56) References Cited

U.S. PATENT DOCUMENTS

| | | |
|---|---|---|
| 404,721 A | 6/1889 | Messer |
| 405,422 A | 6/1889 | Law et al. |
| 2,264,395 A | 12/1941 | Mitchel |
| 2,264,396 A | 12/1941 | Moore |
| 2,298,435 A | 10/1942 | Tunick |
| 2,411,786 A | 11/1946 | Halstead |
| 2,510,273 A | 6/1950 | Barstow et al. |
| 2,516,211 A | 7/1950 | Hochgraf |
| 2,568,342 A | 9/1951 | Koehler et al. |
| 2,577,731 A | 11/1951 | Berger |
| 2,680,162 A | 6/1954 | Brehm et al. |
| 3,045,066 A | 7/1962 | Beuscher |
| 3,280,259 A | 10/1966 | Cotter |
| 3,334,340 A | 8/1967 | McConnell |
| 3,369,078 A | 2/1968 | Stradley |
| 3,370,125 A | 2/1968 | Shaw et al. |
| 3,406,344 A | 10/1968 | Hopper |
| 3,511,936 A | 5/1970 | Saltzberg |
| 3,529,088 A | 9/1970 | Hauer |
| 3,539,727 A | 11/1970 | Pasternack |
| 3,590,271 A | 6/1971 | Peters |
| 3,651,471 A | 3/1972 | Haselwood et al. |
| 3,659,277 A | 4/1972 | Brown |
| 3,699,523 A | 10/1972 | Percher |
| 3,702,460 A | 11/1972 | Blose |
| 3,717,858 A | 2/1973 | Hadden |
| 3,723,653 A | 3/1973 | Tatsuzawa |
| 3,771,069 A | 11/1973 | Levacher et al. |
| 3,796,920 A | 3/1974 | Hedrick et al. |
| 3,806,814 A | 4/1974 | Forbes |
| 3,835,334 A | 9/1974 | Notteau |
| 3,836,888 A | 9/1974 | Boenke et al. |

| | | |
|---|---|---|
| 3,846,638 A | 11/1974 | Wetherell |
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,909,821 A | 9/1975 | Jagoda et al. |
| 3,922,490 A | 11/1975 | Pettis |
| 3,924,077 A | 12/1975 | Blakeslee |
| 3,937,889 A | 2/1976 | Bell, III et al. |
| 3,949,172 A | 4/1976 | Brown et al. |
| 3,959,772 A | 5/1976 | Wakasa et al. |
| 3,962,547 A | 6/1976 | Pattantyus-Abraham |
| 3,968,333 A | 7/1976 | Simokat et al. |
| 3,973,240 A | 8/1976 | Fong |
| 3,975,594 A | 8/1976 | Guntersdorfer |
| 3,992,589 A | 11/1976 | Kuegler |
| 3,993,989 A | 11/1976 | Held et al. |
| 4,008,369 A | 2/1977 | Theurer et al. |
| 4,012,734 A | 3/1977 | Jagoda et al. |
| 4,024,528 A | 5/1977 | Boggs et al. |
| 4,032,911 A | 6/1977 | Melvin, Jr. |
| 4,035,838 A | 7/1977 | Bassani et al. |
| 4,054,910 A | 10/1977 | Chou et al. |
| 4,058,678 A | 11/1977 | Dunn et al. |
| 4,060,735 A | 11/1977 | Pascucci et al. |
| 4,130,874 A | 12/1978 | Pai |
| 4,135,181 A | 1/1979 | Bogacki et al. |
| 4,136,319 A | 1/1979 | Bourde |
| 4,161,720 A | 7/1979 | Bogacki |
| 4,163,218 A | 7/1979 | Wu |
| 4,171,467 A | 10/1979 | Evenchik |
| 4,173,714 A | 11/1979 | Bloch et al. |
| 4,197,431 A | 4/1980 | Vis |
| 4,200,862 A | 4/1980 | Campbell et al. |
| 4,206,320 A | 6/1980 | Keasler et al. |
| 4,216,543 A | 8/1980 | Cagle et al. |
| 4,232,200 A | 11/1980 | Hestad et al. |
| 4,241,243 A | 12/1980 | Ball |
| 4,262,171 A | 4/1981 | Schneider et al. |
| 4,270,206 A | 5/1981 | Hughes |
| 4,272,759 A | 6/1981 | Handy |
| 4,302,629 A | 11/1981 | Foulkes et al. |
| 4,302,750 A | 11/1981 | Wadhwani et al. |
| 4,303,993 A | 12/1981 | Panepinto, Jr. et al. |
| 4,328,579 A | 5/1982 | Hashimoto et al. |
| 4,329,678 A | 5/1982 | Hatfield |
| 4,330,687 A | 5/1982 | Foulkes et al. |
| 4,332,980 A | 6/1982 | Reynolds et al. |
| 4,335,464 A | 6/1982 | Armstrong et al. |
| 4,339,750 A | 7/1982 | Delacruz |
| 4,339,816 A | 7/1982 | Reed |
| 4,348,582 A | 9/1982 | Budek |
| 4,348,668 A | 9/1982 | Gurr et al. |
| 4,357,605 A | 11/1982 | Clements |
| 4,367,548 A | 1/1983 | Cotten, Jr. et al. |
| 4,367,557 A | 1/1983 | Stern et al. |
| 4,373,117 A | 2/1983 | Pierce |
| 4,378,470 A | 3/1983 | Murto et al. |
| 4,380,009 A | 4/1983 | Long et al. |
| 4,381,427 A | 4/1983 | Cheal et al. |
| 4,382,248 A | 5/1983 | Pai |
| 4,387,271 A | 6/1983 | Artom |
| 4,388,489 A | 6/1983 | Wigan et al. |
| 4,389,694 A | 6/1983 | Cornwell, Jr. |
| 4,390,986 A | 6/1983 | Moses |
| 4,393,508 A | 7/1983 | Boudault |
| 4,395,590 A | 7/1983 | Pierce et al. |
| 4,402,059 A | 8/1983 | Kennon et al. |
| 4,413,229 A | 11/1983 | Grant |
| 4,415,774 A | 11/1983 | Driver |
| 4,417,099 A | 11/1983 | Pierce |
| 4,417,207 A | 11/1983 | Sato |
| 4,418,333 A | 11/1983 | Schwarzbach et al. |
| 4,425,642 A | 1/1984 | Moses et al. |
| 4,430,639 A | 2/1984 | Bennett et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,458,236 A | 7/1984 | Perkins |
| 4,459,433 A | 7/1984 | Wortman |
| 4,459,434 A | 7/1984 | Benning et al. |
| 4,462,113 A | 7/1984 | Iwata |
| 4,463,341 A | 7/1984 | Iwasaki |
| 4,467,314 A | 8/1984 | Weikel et al. |
| 4,468,792 A | 8/1984 | Baker et al. |
| 4,475,193 A | 10/1984 | Brown |
| 4,477,896 A | 10/1984 | Aker |
| 4,479,033 A | 10/1984 | Brown et al. |
| 4,479,215 A | 10/1984 | Baker |
| 4,481,501 A | 11/1984 | Perkins |
| 4,484,185 A | 11/1984 | Graves |
| 4,485,400 A | 11/1984 | Lemelson et al. |
| 4,490,683 A | 12/1984 | Rhee |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,507,793 A | 3/1985 | Adams |
| 4,509,211 A | 4/1985 | Robbins |
| 4,510,493 A | 4/1985 | Bux et al. |
| 4,510,611 A | 4/1985 | Dougherty |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,528,667 A | 7/1985 | Fruhauf |
| 4,534,039 A | 8/1985 | Dodds et al. |
| 4,535,401 A | 8/1985 | Penn |
| 4,543,450 A | 9/1985 | Brandt |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,577,333 A | 3/1986 | Lewis et al. |
| 4,578,533 A | 3/1986 | Pierce |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab Der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,602,240 A | 7/1986 | Perkins et al. |
| 4,604,741 A | 8/1986 | Barsellotti |
| 4,608,686 A | 8/1986 | Barsellotti |
| 4,621,170 A | 11/1986 | Picandet |
| 4,631,367 A | 12/1986 | Coviello et al. |
| 4,633,217 A | 12/1986 | Akano |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,665,544 A | 5/1987 | Honda et al. |
| 4,668,934 A | 5/1987 | Shuey |
| 4,669,916 A | 6/1987 | White et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |

| | | | | | |
|---|---|---|---|---|---|
| 4,686,382 A | 8/1987 | Shuey | 4,914,418 A | 4/1990 | Mak et al. |
| 4,686,641 A | 8/1987 | Evans | 4,914,688 A | 4/1990 | Kobayashi et al. |
| 4,691,344 A | 9/1987 | Brown et al. | 4,918,688 A | 4/1990 | Krause et al. |
| 4,692,761 A | 9/1987 | Robinton | 4,918,690 A | 4/1990 | Markkula, Jr. et al. |
| 4,697,166 A | 9/1987 | Warnagiris et al. | 4,924,492 A | 5/1990 | Gitlin et al. |
| 4,701,945 A | 10/1987 | Pedigo | 4,926,158 A | 5/1990 | Zeigler |
| 4,703,306 A | 10/1987 | Barritt | 4,932,022 A | 6/1990 | Keeney et al. |
| 4,703,499 A | 10/1987 | Fossas et al. | 4,932,047 A | 6/1990 | Emmons et al. |
| 4,709,412 A | 11/1987 | Seymour et al. | 4,937,811 A | 6/1990 | Harris |
| 4,714,912 A | 12/1987 | Roberts et al. | 4,939,728 A | 7/1990 | Markkula, Jr. et al. |
| 4,719,616 A | 1/1988 | Akano | 4,945,404 A | 7/1990 | Miller |
| 4,724,435 A | 2/1988 | Moses et al. | 4,947,483 A | 8/1990 | Dirr |
| 4,731,821 A | 3/1988 | Jackson, III | 4,949,187 A | 8/1990 | Cohen |
| 4,733,380 A | 3/1988 | Havira | 4,953,055 A | 8/1990 | Douhet et al. |
| 4,733,389 A | 3/1988 | Puvogel | 4,953,160 A | 8/1990 | Gupta |
| 4,734,919 A | 3/1988 | Tae | 4,954,886 A | 9/1990 | Elberbaum |
| 4,734,932 A | 3/1988 | Lott | 4,955,018 A | 9/1990 | Twitty et al. |
| 4,736,367 A | 4/1988 | Wroblewski et al. | 4,955,048 A | 9/1990 | Iwamura et al. |
| 4,740,963 A | 4/1988 | Eckley | 4,969,136 A | 11/1990 | Chamberlin et al. |
| 4,742,538 A | 5/1988 | Szlam | 4,969,147 A | 11/1990 | Markkula, Jr. et al. |
| 4,745,391 A | 5/1988 | Gajjar | 4,973,954 A | 11/1990 | Schwarz |
| 4,754,326 A | 6/1988 | Kram et al. | 4,975,896 A | 12/1990 | D'Agosto, III et al. |
| 4,755,792 A | 7/1988 | Pezzolo et al. | 4,975,906 A | 12/1990 | Takiyasu et al. |
| 4,757,495 A | 7/1988 | Decker et al. | 4,979,028 A | 12/1990 | Minematsu et al. |
| 4,757,497 A | 7/1988 | Beierle et al. | 4,979,183 A | 12/1990 | Cowart |
| 4,761,646 A | 8/1988 | Choquet et al. | 4,985,892 A | 1/1991 | Camarata |
| 4,763,104 A | 8/1988 | Inoue et al. | 4,989,081 A | 1/1991 | Miyagawa et al. |
| 4,764,922 A | 8/1988 | Dieter et al. | 4,991,221 A | 2/1991 | Rush |
| 4,766,402 A | 8/1988 | Crane | 4,992,774 A | 2/1991 | McCullough |
| 4,768,110 A | 8/1988 | Dunlap et al. | 4,996,709 A | 2/1991 | Heep et al. |
| 4,768,206 A | 8/1988 | Van Gerwen | 5,001,774 A | 3/1991 | Lee |
| 4,769,837 A | 9/1988 | McCormick et al. | 5,003,457 A | 3/1991 | Ikei et al. |
| 4,772,870 A | 9/1988 | Reyes | 5,010,399 A | 4/1991 | Goodman et al. |
| 4,776,006 A | 10/1988 | Comerford et al. | 5,014,308 A | 5/1991 | Fox |
| 4,780,714 A | 10/1988 | Moustakas et al. | 5,018,138 A | 5/1991 | Twitty et al. |
| 4,780,757 A | 10/1988 | Bryer et al. | 5,021,779 A | 6/1991 | Bisak |
| 4,780,758 A | 10/1988 | Lin et al. | 5,022,069 A | 6/1991 | Chen |
| 4,782,322 A | 11/1988 | Lechner et al. | 5,023,868 A | 6/1991 | Davidson et al. |
| 4,785,448 A | 11/1988 | Reichert et al. | 5,025,443 A | 6/1991 | Gupta |
| 4,785,472 A | 11/1988 | Shapiro | 5,027,426 A | 6/1991 | Chiocca, Jr. |
| 4,788,527 A | 11/1988 | Johansson | 5,032,819 A | 7/1991 | Sakuragi et al. |
| 4,789,895 A | 12/1988 | Mustafa et al. | 5,033,062 A | 7/1991 | Morrow et al. |
| 4,789,994 A | 12/1988 | Randall et al. | 5,033,112 A | 7/1991 | Bowling et al. |
| 4,799,211 A | 1/1989 | Felker et al. | 5,034,531 A | 7/1991 | Friary |
| 4,799,213 A | 1/1989 | Fitzgerald | 5,034,882 A | 7/1991 | Eisenhard et al. |
| 4,803,485 A | 2/1989 | Rypinski | 5,034,883 A | 7/1991 | Donaldson et al. |
| 4,803,719 A | 2/1989 | Ulrich | 5,036,513 A | 7/1991 | Greenblatt |
| 4,806,905 A | 2/1989 | McGowan, III et al. | 5,051,822 A | 9/1991 | Rhoades |
| 4,807,225 A | 2/1989 | Fitch | 5,063,563 A | 11/1991 | Ikeda et al. |
| 4,809,296 A | 2/1989 | Braun et al. | 5,065,133 A | 11/1991 | Howard |
| 4,809,339 A | 2/1989 | Shih et al. | 5,068,890 A | 11/1991 | Nilssen |
| 4,814,941 A | 3/1989 | Speet et al. | 5,070,442 A | 12/1991 | Syron-Townson et al. |
| 4,815,106 A | 3/1989 | Propp et al. | 5,070,522 A | 12/1991 | Nilssen |
| 4,821,319 A | 4/1989 | Middleton et al. | 5,089,886 A | 2/1992 | Grandmougin |
| 4,825,349 A | 4/1989 | Marcel | 5,089,927 A | 2/1992 | Bulan et al. |
| 4,825,435 A | 4/1989 | Amundsen et al. | 5,089,974 A | 2/1992 | Demeyer et al. |
| 4,829,570 A | 5/1989 | Schotz | 5,090,052 A | 2/1992 | Nakajima et al. |
| 4,837,799 A | 6/1989 | Prohs et al. | 5,093,828 A | 3/1992 | Braun et al. |
| 4,839,743 A | 6/1989 | Best et al. | 5,095,497 A | 3/1992 | Aman et al. |
| 4,841,281 A | 6/1989 | Melvin, Jr. | 5,099,444 A | 3/1992 | Wilson et al. |
| 4,843,606 A | 6/1989 | Bux et al. | 5,109,222 A | 4/1992 | Welty |
| 4,847,903 A | 7/1989 | Schotz | 5,111,497 A | 5/1992 | Bliven et al. |
| 4,849,811 A | 7/1989 | Kleinerman | 5,113,498 A | 5/1992 | Evan et al. |
| 4,852,151 A | 7/1989 | Dittakavi et al. | 5,121,482 A | 6/1992 | Patton |
| 4,866,602 A | 9/1989 | Hall | 5,125,077 A | 6/1992 | Hall |
| 4,866,704 A | 9/1989 | Bergman | 5,144,544 A | 9/1992 | Jenneve et al. |
| 4,866,757 A | 9/1989 | Nilssen | 5,146,471 A | 9/1992 | Cowart et al. |
| 4,882,747 A | 11/1989 | Williams | 5,148,144 A | 9/1992 | Sutterlin et al. |
| 4,885,747 A | 12/1989 | Foglia | 5,150,365 A | 9/1992 | Hirata et al. |
| 4,885,766 A | 12/1989 | Yasuoka et al. | 5,155,466 A | 10/1992 | Go |
| 4,888,795 A | 12/1989 | Ando et al. | 5,157,711 A | 10/1992 | Shimanuki |
| 4,890,102 A | 12/1989 | Oliver | 5,161,021 A | 11/1992 | Tsai |
| 4,890,316 A | 12/1989 | Walsh et al. | 5,175,764 A | 12/1992 | Patel et al. |
| 4,893,326 A | 1/1990 | Duran et al. | 5,181,240 A | 1/1993 | Sakuragi et al. |
| 4,896,349 A | 1/1990 | Kubo et al. | 5,192,231 A | 3/1993 | Dolin, Jr. |
| 4,899,131 A | 2/1990 | Wilk et al. | 5,198,796 A | 3/1993 | Hessling, Jr. |
| 4,901,218 A | 2/1990 | Cornwell | 5,210,518 A | 5/1993 | Graham et al. |
| 4,901,342 A | 2/1990 | Jones | 5,210,519 A | 5/1993 | Moore |
| 4,903,292 A | 2/1990 | Dillon | 5,210,788 A | 5/1993 | Nilssen |

| | | | | | |
|---|---|---|---|---|---|
| 5,216,704 A | 6/1993 | Williams et al. | 5,483,656 A | 1/1996 | Oprescu et al. |
| 5,220,561 A | 6/1993 | Nuhn et al. | 5,491,402 A | 2/1996 | Small |
| 5,220,597 A | 6/1993 | Horiuchi | 5,491,463 A | 2/1996 | Sargeant et al. |
| 5,224,154 A | 6/1993 | Aldridge et al. | 5,504,454 A | 4/1996 | Daggett et al. |
| 5,241,283 A | 8/1993 | Sutterlin | 5,513,251 A | 4/1996 | Rochkind et al. |
| 5,247,347 A | 9/1993 | Litteral et al. | 5,517,172 A | 5/1996 | Chiu |
| 5,255,267 A | 10/1993 | Hansen et al. | 5,519,731 A | 5/1996 | Cioffi |
| 5,257,006 A | 10/1993 | Graham et al. | 5,521,491 A | 5/1996 | Najam |
| 5,264,823 A | 11/1993 | Stevens | 5,525,962 A | 6/1996 | Tice |
| 5,265,154 A | 11/1993 | Schotz | 5,528,089 A | 6/1996 | Guiset et al. |
| 5,268,676 A | 12/1993 | Asprey | 5,530,737 A | 6/1996 | Bartholomew et al. |
| 5,274,631 A | 12/1993 | Bhardwaj | 5,530,748 A | 6/1996 | Ohmori |
| 5,283,637 A | 2/1994 | Goolcharan | 5,533,101 A | 7/1996 | Miyagawa |
| 5,283,825 A | 2/1994 | Druckman et al. | 5,534,912 A | 7/1996 | Kostreski |
| 5,285,477 A | 2/1994 | Leonowich | 5,535,336 A | 7/1996 | Smith et al. |
| 5,289,359 A | 2/1994 | Ziermann | 5,539,805 A | 7/1996 | Bushue et al. |
| 5,289,476 A | 2/1994 | Johnson et al. | 5,544,243 A | 8/1996 | Papadopoulos |
| 5,311,114 A | 5/1994 | Sambamurthy et al. | 5,546,385 A | 8/1996 | Caspi et al. |
| 5,311,518 A | 5/1994 | Takato et al. | 5,548,592 A | 8/1996 | Komarek et al. |
| 5,311,593 A | 5/1994 | Carmi | 5,548,614 A | 8/1996 | Stoll et al. |
| 5,319,571 A | 6/1994 | Langer et al. | 5,550,836 A | 8/1996 | Albrecht et al. |
| 5,319,634 A | 6/1994 | Bartholomew et al. | 5,550,900 A | 8/1996 | Ensor et al. |
| 5,323,461 A | 6/1994 | Rosenbaum et al. | 5,553,063 A | 9/1996 | Dickson |
| 5,334,975 A | 8/1994 | Wachob et al. | 5,553,138 A | 9/1996 | Heald et al. |
| 5,341,370 A | 8/1994 | Nuhn et al. | 5,557,612 A | 9/1996 | Bingham |
| 5,341,415 A | 8/1994 | Baran | 5,559,377 A | 9/1996 | Abraham |
| 5,343,240 A | 8/1994 | Yu | 5,563,515 A | 10/1996 | Kako |
| 5,343,514 A | 8/1994 | Snyder | 5,566,233 A | 10/1996 | Liu |
| 5,345,437 A | 9/1994 | Ogawa | 5,568,547 A | 10/1996 | Nishimura |
| 5,347,549 A | 9/1994 | Baumann et al. | 5,570,085 A | 10/1996 | Bertsch |
| 5,351,272 A | 9/1994 | Abraham | 5,572,182 A | 11/1996 | De Pinho Filho et al. |
| 5,352,957 A | 10/1994 | Werner | 5,574,748 A | 11/1996 | Vander Mey et al. |
| 5,353,334 A | 10/1994 | O'Sullivan | 5,579,221 A | 11/1996 | Mun |
| 5,353,409 A | 10/1994 | Asprey et al. | 5,579,335 A | 11/1996 | Sutterlin et al. |
| 5,355,114 A | 10/1994 | Sutterlin et al. | 5,579,486 A | 11/1996 | Oprescu et al. |
| 5,356,311 A | 10/1994 | Liu | 5,581,555 A | 12/1996 | Dubberly et al. |
| 5,363,432 A | 11/1994 | Martin et al. | 5,581,801 A | 12/1996 | Spriester et al. |
| 5,368,041 A | 11/1994 | Shambroom | 5,583,934 A | 12/1996 | Zhou |
| 5,369,356 A | 11/1994 | Kinney et al. | 5,587,692 A | 12/1996 | Graham et al. |
| 5,375,051 A | 12/1994 | Decker et al. | 5,592,482 A | 1/1997 | Abraham |
| 5,379,005 A | 1/1995 | Aden et al. | 5,592,540 A | 1/1997 | Beveridge |
| 5,381,462 A | 1/1995 | Larson et al. | 5,594,789 A | 1/1997 | Seazholtz et al. |
| 5,381,804 A | 1/1995 | Shambroom | 5,596,631 A | 1/1997 | Chen |
| 5,391,932 A | 2/1995 | Small et al. | 5,599,206 A | 2/1997 | Slack et al. |
| 5,396,636 A | 3/1995 | Gallagher et al. | 5,604,737 A | 2/1997 | Iwami et al. |
| 5,400,246 A | 3/1995 | Wilson et al. | 5,604,791 A | 2/1997 | Lee |
| 5,404,127 A | 4/1995 | Lee et al. | 5,608,447 A | 3/1997 | Farry et al. |
| 5,406,260 A | 4/1995 | Cummings et al. | 5,608,725 A | 3/1997 | Grube et al. |
| 5,408,260 A | 4/1995 | Arnon | 5,608,792 A | 3/1997 | Laidler |
| 5,410,343 A | 4/1995 | Coddington et al. | 5,610,552 A | 3/1997 | Schlesinger et al. |
| 5,410,535 A | 4/1995 | Yang et al. | 5,610,916 A | 3/1997 | Kostreski et al. |
| 5,414,708 A | 5/1995 | Webber et al. | 5,610,922 A | 3/1997 | Balatoni |
| 5,420,578 A | 5/1995 | O'Brien et al. | 5,613,130 A | 3/1997 | Teng et al. |
| 5,420,886 A | 5/1995 | Ohmori | 5,613,190 A | 3/1997 | Hylton |
| 5,421,030 A | 5/1995 | Baran | 5,613,191 A | 3/1997 | Hylton et al. |
| 5,422,519 A | 6/1995 | Russell | 5,614,811 A | 3/1997 | Sagalovich et al. |
| 5,424,710 A | 6/1995 | Baumann | 5,619,252 A | 4/1997 | Nakano |
| 5,425,089 A | 6/1995 | Chan et al. | 5,619,505 A | 4/1997 | Grube et al. |
| 5,428,608 A | 6/1995 | Freeman et al. | 5,621,455 A | 4/1997 | Rogers et al. |
| 5,428,682 A | 6/1995 | Apfel | 5,623,537 A | 4/1997 | Ensor et al. |
| 5,438,678 A | 8/1995 | Smith | 5,625,651 A | 4/1997 | Cioffi |
| 5,440,335 A | 8/1995 | Beveridge | 5,625,677 A | 4/1997 | Feiertag et al. |
| 5,448,635 A | 9/1995 | Biehl et al. | 5,625,863 A | 4/1997 | Abraham |
| 5,450,393 A | 9/1995 | Watanabe et al. | 5,627,501 A | 5/1997 | Biran et al. |
| 5,451,923 A | 9/1995 | Seberger et al. | 5,627,827 A | 5/1997 | Dale et al. |
| 5,452,289 A | 9/1995 | Sharma et al. | 5,635,896 A | 6/1997 | Tinsley et al. |
| 5,454,008 A | 9/1995 | Baumann et al. | 5,644,286 A | 7/1997 | Brosh et al. |
| 5,457,629 A | 10/1995 | Miller et al. | 5,646,983 A | 7/1997 | Suffern et al. |
| 5,459,459 A | 10/1995 | Lee, Jr. | 5,651,696 A | 7/1997 | Jennison |
| 5,461,671 A | 10/1995 | Sakuragi et al. | 5,652,893 A | 7/1997 | Ben-Meir et al. |
| 5,463,616 A | 10/1995 | Kruse et al. | 5,659,608 A | 8/1997 | Stiefel |
| 5,469,150 A | 11/1995 | Sitte | 5,668,814 A | 9/1997 | Balatoni |
| 5,471,190 A | 11/1995 | Zimmermann | 5,668,857 A | 9/1997 | McHale |
| 5,475,363 A | 12/1995 | Suzuki et al. | 5,671,220 A | 9/1997 | Tonomura |
| 5,475,687 A | 12/1995 | Markkula, Jr. et al. | 5,673,290 A | 9/1997 | Cioffi |
| 5,477,091 A | 12/1995 | Fiorina et al. | 5,675,375 A | 10/1997 | Riffee |
| 5,479,447 A | 12/1995 | Chow et al. | 5,675,813 A | 10/1997 | Holmdahl |
| 5,483,230 A | 1/1996 | Mueller | 5,680,397 A | 10/1997 | Christensen et al. |
| 5,483,574 A | 1/1996 | Yuyama | 5,682,423 A | 10/1997 | Walker |

| | | | | | |
|---|---|---|---|---|---|
| 5,684,826 A | 11/1997 | Ratner | 5,844,949 A | 12/1998 | Hershey et al. |
| 5,689,230 A | 11/1997 | Merwin et al. | 5,845,190 A | 12/1998 | Bushue et al. |
| 5,689,242 A | 11/1997 | Sims et al. | 5,848,054 A | 12/1998 | Mosebrook et al. |
| 5,691,691 A | 11/1997 | Merwin et al. | 5,848,150 A | 12/1998 | Bingel |
| 5,694,108 A | 12/1997 | Shuey | 5,848,376 A | 12/1998 | Steiner et al. |
| 5,696,790 A | 12/1997 | Graham et al. | 5,859,584 A | 1/1999 | Counsell et al. |
| 5,696,861 A | 12/1997 | Schimmeyer et al. | 5,859,596 A | 1/1999 | McRae |
| 5,699,276 A | 12/1997 | Roos | 5,864,284 A | 1/1999 | Sanderson |
| 5,699,413 A | 12/1997 | Sridhar | 5,878,047 A | 3/1999 | Ganek et al. |
| 5,705,974 A | 1/1998 | Patel et al. | 5,878,133 A | 3/1999 | Zhou et al. |
| 5,706,007 A | 1/1998 | Fragnito et al. | 5,884,086 A | 3/1999 | Amoni et al. |
| 5,706,157 A | 1/1998 | Galecki et al. | 5,886,732 A | 3/1999 | Humpleman |
| 5,708,701 A | 1/1998 | Houvig et al. | 5,889,856 A | 3/1999 | O'Toole et al. |
| 5,712,614 A | 1/1998 | Patel et al. | 5,892,430 A | 4/1999 | Wiesman et al. |
| 5,712,977 A | 1/1998 | Glad et al. | 5,892,764 A | 4/1999 | Riemann et al. |
| 5,727,025 A | 3/1998 | Maryanka | 5,892,792 A | 4/1999 | Walley |
| 5,729,824 A | 3/1998 | O'Neill et al. | 5,892,795 A | 4/1999 | Paret |
| 5,731,664 A | 3/1998 | Posa | 5,896,443 A | 4/1999 | Dichter |
| 5,734,658 A | 3/1998 | Rall et al. | 5,896,556 A | 4/1999 | Moreland et al. |
| 5,736,965 A | 4/1998 | Mosebrook et al. | 5,898,761 A | 4/1999 | McHale et al. |
| 5,742,527 A | 4/1998 | Rybicki et al. | 5,903,213 A | 5/1999 | Hodge et al. |
| 5,742,596 A | 4/1998 | Baratz et al. | 5,903,643 A | 5/1999 | Bruhnke |
| 5,746,634 A | 5/1998 | Jankowski et al. | 5,905,442 A | 5/1999 | Mosebrook et al. |
| 5,748,634 A | 5/1998 | Sokol et al. | 5,905,781 A | 5/1999 | McHale et al. |
| 5,748,671 A | 5/1998 | Sutterlin et al. | 5,905,786 A | 5/1999 | Hoopes |
| 5,751,701 A | 5/1998 | Langberg et al. | 5,910,970 A | 6/1999 | Lu |
| 5,754,539 A | 5/1998 | Metz et al. | 5,911,119 A | 6/1999 | Bartholomew et al. |
| 5,756,280 A | 5/1998 | Soora et al. | 5,912,895 A | 6/1999 | Terry et al. |
| 5,757,803 A | 5/1998 | Russell et al. | 5,917,624 A | 6/1999 | Wagner |
| 5,757,936 A | 5/1998 | Lee | 5,917,814 A | 6/1999 | Balatoni |
| 5,764,743 A | 6/1998 | Goedken et al. | 5,929,749 A | 7/1999 | Slonim et al. |
| 5,768,279 A | 6/1998 | Barn et al. | 5,929,896 A | 7/1999 | Goodman et al. |
| 5,771,236 A | 6/1998 | Sansom et al. | 5,930,340 A | 7/1999 | Bell |
| 5,774,526 A | 6/1998 | Propp et al. | 5,933,073 A | 8/1999 | Shuey |
| 5,774,789 A | 6/1998 | van der Kaay et al. | 5,936,963 A | 8/1999 | Saussy |
| 5,777,769 A | 7/1998 | Coutinho | 5,937,055 A | 8/1999 | Kaplan |
| 5,778,303 A | 7/1998 | Shinozaki et al. | 5,937,342 A | 8/1999 | Kline |
| 5,781,617 A | 7/1998 | McHale et al. | 5,938,757 A | 8/1999 | Bertsch |
| 5,781,844 A | 7/1998 | Spriester et al. | 5,939,801 A | 8/1999 | Bouffard et al. |
| 5,787,115 A | 7/1998 | Turnbull et al. | 5,940,400 A | 8/1999 | Eastmond et al. |
| 5,790,548 A | 8/1998 | Sistanizadeh et al. | 5,940,479 A | 8/1999 | Guy et al. |
| 5,793,413 A | 8/1998 | Hylton et al. | 5,940,738 A | 8/1999 | Rao |
| 5,796,739 A | 8/1998 | Kim et al. | 5,943,404 A | 8/1999 | Sansom et al. |
| 5,796,965 A | 8/1998 | Choi et al. | 5,944,831 A | 8/1999 | Pate et al. |
| 5,799,069 A | 8/1998 | Weston et al. | 5,949,473 A | 9/1999 | Goodman |
| 5,799,196 A | 8/1998 | Flannery | 5,949,476 A | 9/1999 | Pocock et al. |
| 5,801,635 A | 9/1998 | Price | 5,956,323 A | 9/1999 | Bowie |
| 5,802,173 A | 9/1998 | Hamilton-Piercy et al. | 5,960,066 A | 9/1999 | Hartmann et al. |
| 5,802,283 A | 9/1998 | Grady et al. | 5,960,208 A | 9/1999 | Obata et al. |
| 5,805,053 A | 9/1998 | Patel et al. | 5,963,539 A | 10/1999 | Webber, Jr. et al. |
| 5,805,591 A | 9/1998 | Naboulsi et al. | 5,963,595 A | 10/1999 | Graham et al. |
| 5,805,597 A | 9/1998 | Edem | 5,963,844 A | 10/1999 | Dail |
| 5,805,806 A | 9/1998 | McArthur | 5,970,127 A | 10/1999 | Smith et al. |
| 5,809,033 A | 9/1998 | Turner et al. | 5,973,942 A | 10/1999 | Nelson et al. |
| 5,812,786 A | 9/1998 | Seazholtz et al. | 5,974,553 A | 10/1999 | Gandar |
| 5,815,086 A | 9/1998 | Ivie et al. | 5,977,650 A | 11/1999 | Rickard et al. |
| 5,815,681 A | 9/1998 | Kikinis | 5,977,913 A | 11/1999 | Christ |
| 5,818,127 A | 10/1998 | Abraham | 5,982,052 A | 11/1999 | Sosnowski |
| 5,818,710 A | 10/1998 | LeVan Suu | 5,982,784 A | 11/1999 | Bell |
| 5,818,821 A | 10/1998 | Schurig | 5,982,854 A | 11/1999 | Ehreth |
| 5,822,374 A | 10/1998 | Levin | 5,987,061 A | 11/1999 | Chen |
| 5,822,677 A | 10/1998 | Peyrovian | 5,990,577 A | 11/1999 | Kamioka et al. |
| 5,822,678 A | 10/1998 | Evanyk | 5,991,311 A | 11/1999 | Long et al. |
| 5,826,196 A | 10/1998 | Cuthrell | 5,991,885 A | 11/1999 | Chang et al. |
| 5,828,293 A | 10/1998 | Rickard | 5,994,998 A | 11/1999 | Fisher et al. |
| 5,828,558 A | 10/1998 | Korcharz et al. | 5,995,598 A | 11/1999 | Berstis |
| 5,828,821 A | 10/1998 | Hoshina et al. | 5,999,518 A | 12/1999 | Nattkemper et al. |
| 5,832,057 A | 11/1998 | Furman | 6,002,682 A | 12/1999 | Bellenger et al. |
| 5,832,364 A | 11/1998 | Gustafson | 6,002,722 A | 12/1999 | Wu |
| 5,835,005 A | 11/1998 | Furukawa et al. | 6,005,476 A | 12/1999 | Valiulis |
| 5,838,777 A | 11/1998 | Chang et al. | 6,005,873 A | 12/1999 | Amit |
| 5,838,989 A | 11/1998 | Hutchison et al. | 6,009,465 A | 12/1999 | Decker et al. |
| 5,841,360 A | 11/1998 | Binder | 6,009,479 A | 12/1999 | Jeffries |
| 5,841,840 A | 11/1998 | Smith et al. | 6,011,781 A | 1/2000 | Bell |
| 5,841,841 A | 11/1998 | Dodds et al. | 6,011,794 A | 1/2000 | Mordowitz et al. |
| 5,842,032 A | 11/1998 | Bertsch | 6,011,910 A | 1/2000 | Chau et al. |
| 5,842,111 A | 11/1998 | Byers | 6,014,386 A | 1/2000 | Abraham |
| 5,844,789 A | 12/1998 | Wynn | 6,014,431 A | 1/2000 | McHale et al. |
| 5,844,888 A | 12/1998 | Markkula, Jr. et al. | 6,016,519 A | 1/2000 | Chida et al. |

| | | | | | | |
|---|---|---|---|---|---|---|
| 6,021,158 | A | 2/2000 | Schurr et al. | 6,167,043 A | 12/2000 | Frantz |
| 6,025,945 | A | 2/2000 | Nyu et al. | 6,167,120 A | 12/2000 | Kikinis |
| 6,026,078 | A | 2/2000 | Smith | 6,169,795 B1 | 1/2001 | Dunn et al. |
| 6,026,150 | A | 2/2000 | Frank et al. | 6,175,556 B1 | 1/2001 | Allen, Jr. et al. |
| 6,026,160 | A | 2/2000 | Staber et al. | 6,175,860 B1 | 1/2001 | Gaucher |
| 6,028,867 | A | 2/2000 | Rawson et al. | 6,177,884 B1 | 1/2001 | Hunt et al. |
| 6,029,047 | A | 2/2000 | Ishida et al. | 6,178,161 B1 | 1/2001 | Terry |
| 6,033,101 | A | 3/2000 | Reddick et al. | 6,178,514 B1 | 1/2001 | Wood |
| 6,034,988 | A | 3/2000 | VanderMey et al. | 6,181,775 B1 | 1/2001 | Bella |
| 6,037,678 | A | 3/2000 | Rickard | 6,181,783 B1 | 1/2001 | Goodman |
| 6,038,300 | A | 3/2000 | Hartmann et al. | 6,185,284 B1 | 2/2001 | Goodman |
| 6,038,425 | A | 3/2000 | Jeffrey | 6,186,826 B1 | 2/2001 | Weikle |
| 6,038,457 | A | 3/2000 | Barkat | 6,188,314 B1 | 2/2001 | Wallace et al. |
| 6,047,055 | A | 4/2000 | Carkner et al. | 6,188,557 B1 | 2/2001 | Chaudhry |
| 6,049,471 | A | 4/2000 | Korcharz et al. | 6,192,399 B1 | 2/2001 | Goodman |
| 6,049,531 | A | 4/2000 | Roy | 6,195,706 B1 | 2/2001 | Scott |
| 6,049,881 | A | 4/2000 | Massman et al. | 6,202,211 B1 | 3/2001 | Williams, Jr. |
| 6,052,380 | A | 4/2000 | Bell | 6,205,202 B1 | 3/2001 | Yoshida et al. |
| 6,055,268 | A | 4/2000 | Timm et al. | 6,208,637 B1 | 3/2001 | Eames |
| 6,055,435 | A | 4/2000 | Smith et al. | 6,212,204 B1 | 4/2001 | Depue |
| 6,055,633 | A | 4/2000 | Schrier | 6,212,227 B1 | 4/2001 | Ko et al. |
| 6,061,357 | A | 5/2000 | Olshansky et al. | 6,212,274 B1 | 4/2001 | Ninh |
| 6,061,392 | A | 5/2000 | Bremer et al. | 6,212,658 B1 | 4/2001 | Le Van Suu |
| 6,064,422 | A | 5/2000 | Goolcharan et al. | 6,215,789 B1 | 4/2001 | Keenan et al. |
| 6,069,588 | A | 5/2000 | O'Neill, Jr. | 6,215,855 B1 | 4/2001 | Schneider |
| 6,069,879 | A | 5/2000 | Chatter | 6,216,160 B1 | 4/2001 | Dichter |
| 6,069,899 | A | 5/2000 | Foley | 6,218,930 B1 | 4/2001 | Katzenberg et al. |
| 6,072,779 | A | 6/2000 | Tzannes et al. | 6,219,409 B1 | 4/2001 | Smith et al. |
| 6,072,810 | A | 6/2000 | Van der Putten et al. | 6,227,499 B1 | 5/2001 | Jennison et al. |
| 6,075,784 | A | 6/2000 | Frankel et al. | 6,229,433 B1 | 5/2001 | Rye et al. |
| 6,081,519 | A | 6/2000 | Petler | 6,229,818 B1 | 5/2001 | Bell |
| 6,081,533 | A | 6/2000 | Laubach et al. | 6,236,653 B1 | 5/2001 | Dalton et al. |
| 6,087,835 | A | 7/2000 | Haneda | 6,236,664 B1 | 5/2001 | Erreygers |
| 6,087,860 | A | 7/2000 | Liu et al. | 6,236,718 B1 | 5/2001 | Goodman |
| 6,088,368 | A | 7/2000 | Rubinstain et al. | 6,239,672 B1 | 5/2001 | Lutz, Jr. et al. |
| 6,094,441 | A | 7/2000 | Jung et al. | 6,240,091 B1 | 5/2001 | Ginzboorg et al. |
| 6,095,867 | A | 8/2000 | Brandt et al. | 6,240,166 B1 | 5/2001 | Collin et al. |
| 6,097,761 | A | 8/2000 | Buhring et al. | 6,243,394 B1 | 6/2001 | Deng |
| 6,097,801 | A | 8/2000 | Williams et al. | 6,243,413 B1 | 6/2001 | Beukema |
| 6,101,341 | A | 8/2000 | Manabe | 6,243,446 B1 | 6/2001 | Goodman |
| 6,104,707 | A | 8/2000 | Abraham | 6,243,571 B1 | 6/2001 | Bullock et al. |
| 6,107,656 | A | 8/2000 | Igarashi | 6,243,818 B1 | 6/2001 | Schwan et al. |
| 6,107,912 | A | 8/2000 | Bullock et al. | 6,246,695 B1 | 6/2001 | Seazholtz et al. |
| 6,108,330 | A | 8/2000 | Bhatia et al. | 6,246,716 B1 | 6/2001 | Schneider |
| 6,109,959 | A | 8/2000 | Burlinson et al. | 6,246,748 B1 | 6/2001 | Yano |
| 6,111,595 | A | 8/2000 | Hertrich | 6,249,213 B1 | 6/2001 | Horne |
| 6,111,764 | A | 8/2000 | Atou et al. | 6,252,754 B1 | 6/2001 | Chaudhry |
| 6,111,936 | A | 8/2000 | Bremer | 6,252,755 B1 | 6/2001 | Willer |
| 6,114,632 | A | 9/2000 | Planas, Sr. et al. | 6,252,957 B1 | 6/2001 | Jauregui et al. |
| 6,114,970 | A | 9/2000 | Kirson et al. | 6,256,518 B1 | 7/2001 | Buhrmann |
| 6,115,468 | A | 9/2000 | De Nicolo | 6,259,676 B1 | 7/2001 | Kellock et al. |
| 6,115,755 | A | 9/2000 | Krishan | 6,259,775 B1 | 7/2001 | Alpert et al. |
| 6,115,822 | A | 9/2000 | Kim et al. | 6,266,348 B1 | 7/2001 | Gross et al. |
| 6,123,577 | A | 9/2000 | Contois et al. | 6,272,219 B1 | 8/2001 | De Bruycker et al. |
| 6,125,448 | A | 9/2000 | Schwan et al. | 6,278,769 B1 | 8/2001 | Bella |
| 6,126,463 | A | 10/2000 | Okazaki et al. | 6,281,784 B1 | 8/2001 | Redgate et al. |
| 6,127,925 | A | 10/2000 | Bonsignore et al. | 6,282,075 B1 | 8/2001 | Chaudhry |
| 6,128,471 | A | 10/2000 | Quelch et al. | 6,282,238 B1 | 8/2001 | Landry |
| 6,128,743 | A | 10/2000 | Rothenbaum | 6,282,277 B1 | 8/2001 | DeBalko |
| 6,130,879 | A | 10/2000 | Liu | 6,283,789 B1 | 9/2001 | Tsai |
| 6,130,893 | A | 10/2000 | Whittaker et al. | 6,285,754 B1 | 9/2001 | Sun et al. |
| 6,130,896 | A | 10/2000 | Lueker et al. | 6,286,049 B1 | 9/2001 | Rajakarunanayake et al. |
| 6,134,235 | A | 10/2000 | Goldman et al. | 6,288,334 B1 | 9/2001 | Hennum |
| 6,134,308 | A | 10/2000 | Fallon et al. | 6,288,631 B1 | 9/2001 | Shinozaki et al. |
| 6,137,865 | A | 10/2000 | Ripy et al. | 6,290,141 B1 | 9/2001 | Park et al. |
| 6,137,866 | A | 10/2000 | Staber et al. | 6,292,467 B1 | 9/2001 | Keller |
| 6,141,330 | A | 10/2000 | Akers | 6,292,517 B1 | 9/2001 | Jeffress et al. |
| 6,141,339 | A | 10/2000 | Kaplan et al. | 6,295,356 B1 | 9/2001 | De Nicolo |
| 6,141,356 | A | 10/2000 | Gorman | 6,298,037 B1 | 10/2001 | Sharifi |
| 6,141,763 | A | 10/2000 | Smith et al. | 6,301,337 B1 | 10/2001 | Scholtz et al. |
| 6,144,292 | A | 11/2000 | Brown | 6,301,527 B1 | 10/2001 | Butland et al. |
| 6,144,399 | A | 11/2000 | Manchester et al. | 6,308,215 B1 | 10/2001 | Kolbet et al. |
| 6,148,006 | A | 11/2000 | Dyke et al. | 6,308,240 B1 | 10/2001 | De Nicolo |
| 6,151,480 | A | 11/2000 | Fischer et al. | 6,310,286 B1 | 10/2001 | Troxel et al. |
| 6,154,465 | A | 11/2000 | Pickett | 6,310,781 B1 | 10/2001 | Karam |
| 6,157,645 | A | 12/2000 | Shobatake | 6,310,894 B1 | 10/2001 | Counterman |
| 6,157,716 | A | 12/2000 | Ortel | 6,310,909 B1 | 10/2001 | Jones |
| 6,160,880 | A | 12/2000 | Allen | 6,314,102 B1 | 11/2001 | Czerwiec et al. |
| 6,166,496 | A | 12/2000 | Lys et al. | 6,317,839 B1 | 11/2001 | Wells |

| | | |
|---|---|---|
| 6,317,884 B1 | 11/2001 | Eames et al. |
| 6,320,494 B1 | 11/2001 | Bartels et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,329,937 B1 | 12/2001 | Harman |
| 6,346,964 B1 | 2/2002 | Rogers et al. |
| 6,348,874 B1 | 2/2002 | Cole et al. |
| 6,349,133 B1 | 2/2002 | Matthews et al. |
| 6,353,629 B1 | 3/2002 | Pal |
| 6,356,562 B1 | 3/2002 | Bamba |
| 6,357,011 B2 | 3/2002 | Gilbert |
| 6,359,906 B1 | 3/2002 | Dyke et al. |
| 6,362,610 B1 | 3/2002 | Yang |
| 6,363,066 B1 | 3/2002 | Frimodig |
| 6,364,535 B1 | 4/2002 | Coffey |
| 6,366,143 B1 | 4/2002 | Liu et al. |
| 6,370,149 B1 | 4/2002 | Gorman et al. |
| 6,377,163 B1 | 4/2002 | Deller et al. |
| 6,377,874 B1 | 4/2002 | Ykema |
| 6,383,076 B1 | 5/2002 | Tiedeken |
| 6,385,024 B1 | 5/2002 | Olson |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,389,139 B1 | 5/2002 | Curtis et al. |
| 6,393,050 B1 | 5/2002 | Liu |
| 6,393,607 B1 | 5/2002 | Hughes et al. |
| 6,396,391 B1 | 5/2002 | Binder |
| 6,396,393 B2 | 5/2002 | Yuasa |
| 6,396,837 B1 | 5/2002 | Wang et al. |
| 6,404,773 B1 | 6/2002 | Williams et al. |
| 6,404,861 B1 | 6/2002 | Cohen et al. |
| 6,414,952 B2 | 7/2002 | Foley |
| 6,417,762 B1 | 7/2002 | Comer |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,441,723 B1 | 8/2002 | Mansfield, Jr. et al. |
| 6,442,129 B1 | 8/2002 | Yonge, III et al. |
| 6,442,195 B1 | 8/2002 | Liu et al. |
| 6,445,087 B1 | 9/2002 | Wang et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,459,175 B1 | 10/2002 | Potega |
| 6,459,275 B1 | 10/2002 | Ewalt et al. |
| 6,459,692 B1 | 10/2002 | Ben-Michael et al. |
| 6,470,053 B1 | 10/2002 | Liu |
| 6,470,401 B1 | 10/2002 | Peterson |
| 6,473,495 B1 | 10/2002 | Willer |
| 6,473,608 B1 | 10/2002 | Lehr et al. |
| 6,477,457 B1 | 11/2002 | Fendt et al. |
| 6,477,595 B1 | 11/2002 | Cohen et al. |
| 6,480,122 B1 | 11/2002 | Oddy et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,483,903 B1 | 11/2002 | Itay |
| 6,490,273 B1 | 12/2002 | DeNap et al. |
| 6,493,325 B1 | 12/2002 | Hjalmtysson et al. |
| 6,493,875 B1 | 12/2002 | Eames et al. |
| 6,496,103 B1 | 12/2002 | Weiss et al. |
| 6,496,104 B2 | 12/2002 | Kline |
| 6,501,389 B1 | 12/2002 | Aguirre |
| 6,507,647 B1 | 1/2003 | Mandalia |
| 6,510,204 B2 | 1/2003 | De Clercq et al. |
| 6,518,724 B2 | 2/2003 | Janik |
| 6,519,291 B1 | 2/2003 | Dagdeviren |
| 6,522,352 B1 | 2/2003 | Strandwitz et al. |
| 6,522,515 B1 | 2/2003 | Whitney |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,516 B1 | 2/2003 | Ishikawa et al. |
| 6,526,581 B1 | 2/2003 | Edson |
| 6,529,443 B2 | 3/2003 | Downey, Jr. et al. |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,535,983 B1 | 3/2003 | McCormack et al. |
| 6,539,011 B1 | 3/2003 | Keenan et al. |
| 6,539,484 B1 | 3/2003 | Cruz |
| 6,541,878 B1 | 4/2003 | Diab |
| 6,542,465 B1 | 4/2003 | Wang |
| 6,542,585 B2 | 4/2003 | Goodman |
| 6,546,024 B1 | 4/2003 | Sharper et al. |
| 6,546,098 B1 | 4/2003 | Henderson |
| 6,546,494 B1 | 4/2003 | Jackson et al. |
| 6,549,616 B1 | 4/2003 | Binder |
| 6,553,076 B1 | 4/2003 | Huang |
| 6,556,097 B2 | 4/2003 | Coffey |
| 6,556,564 B2 | 4/2003 | Rogers |
| 6,556,581 B1 | 4/2003 | He et al. |
| 6,559,757 B1 | 5/2003 | Deller et al. |
| 6,560,319 B1 | 5/2003 | Binder |
| 6,560,333 B1 | 5/2003 | Consiglio et al. |
| 6,563,418 B1 | 5/2003 | Moon |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,571,181 B1 | 5/2003 | Rakshani et al. |
| 6,571,305 B1 | 5/2003 | Engler |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,574,741 B1 | 6/2003 | Fujimori et al. |
| 6,577,230 B1 | 6/2003 | Wendt et al. |
| 6,577,231 B2 | 6/2003 | Litwin, Jr. et al. |
| 6,577,631 B1 | 6/2003 | Keenan et al. |
| 6,577,882 B2 | 6/2003 | Roos |
| 6,580,254 B2 | 6/2003 | Schofield |
| 6,580,710 B1 | 6/2003 | Bowen et al. |
| 6,580,727 B1 | 6/2003 | Yim et al. |
| 6,580,785 B2 | 6/2003 | Bremer et al. |
| 6,583,719 B2 | 6/2003 | Okada et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,473 B2 | 7/2003 | Terry et al. |
| 6,587,479 B1 | 7/2003 | Bianchi |
| 6,587,560 B1 | 7/2003 | Scott et al. |
| 6,597,732 B1 | 7/2003 | Dowling |
| 6,601,097 B1 | 7/2003 | Cheston et al. |
| 6,603,220 B2 | 8/2003 | Vergnaud |
| 6,603,808 B1 | 8/2003 | Anne et al. |
| 6,608,264 B1 | 8/2003 | Fouladpour |
| 6,611,537 B1 | 8/2003 | Edens et al. |
| 6,616,005 B1 | 9/2003 | Pereira et al. |
| 6,636,505 B1 | 10/2003 | Wang et al. |
| 6,639,913 B1 | 10/2003 | Frankel et al. |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,653,932 B1 | 11/2003 | Beamish et al. |
| 6,657,994 B1 | 12/2003 | Rajakarunanayake |
| 6,658,098 B1 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,404 B2 | 12/2003 | Cohen |
| 6,671,360 B2 | 12/2003 | Sumiya et al. |
| 6,674,843 B1 | 1/2004 | Ham |

| | | |
|---|---|---|
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,681,013 B1 | 1/2004 | Miyamoto |
| 6,686,832 B2 | 2/2004 | Abraham |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,701,443 B1 | 3/2004 | Bell |
| 6,704,414 B2 | 3/2004 | Murakoshi |
| 6,704,824 B1 | 3/2004 | Goodman |
| 6,710,704 B2 | 3/2004 | Fisher et al. |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,715,087 B1 | 3/2004 | Vergnaud et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,738,641 B1 | 5/2004 | Elsasser |
| 6,744,883 B1 | 6/2004 | Bingel et al. |
| 6,747,859 B2 | 6/2004 | Walbeck et al. |
| 6,747,995 B1 | 6/2004 | Brown et al. |
| 6,747,996 B2 | 6/2004 | Holloway et al. |
| 6,748,078 B1 | 6/2004 | Posthuma |
| 6,754,186 B1 | 6/2004 | Bullman |
| 6,754,235 B2 | 6/2004 | Van Der Putten et al. |
| 6,755,575 B2 | 6/2004 | Kronlund et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,299 B1 | 8/2004 | Olson et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,788,782 B1 | 9/2004 | Fotsch et al. |
| 6,792,323 B2 | 9/2004 | Krzyzanowski et al. |
| 6,795,539 B2 | 9/2004 | Culli et al. |
| 6,798,767 B1 | 9/2004 | Alexander et al. |
| 6,800,957 B2 | 10/2004 | Nerone et al. |
| 6,804,351 B1 | 10/2004 | Karam |
| 6,804,828 B1 | 10/2004 | Shibata |
| 6,813,343 B1 | 11/2004 | Vitenberg |
| 6,815,844 B2 | 11/2004 | Kovarik |
| 6,816,512 B1 | 11/2004 | Lazarus et al. |
| 6,819,760 B1 | 11/2004 | Nayler |
| 6,823,047 B1 | 11/2004 | Cruickshank |
| 6,825,672 B1 | 11/2004 | Lo et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,831,976 B1 | 12/2004 | Comerford et al. |
| 6,834,057 B1 | 12/2004 | Rabenko et al. |
| 6,836,546 B1 | 12/2004 | Willer |
| 6,839,345 B2 | 1/2005 | Lu et al. |
| 6,841,979 B2 | 1/2005 | Berson et al. |
| 6,842,426 B2 | 1/2005 | Bogardus et al. |
| 6,842,459 B1 | 1/2005 | Binder |
| 6,844,810 B2 | 1/2005 | Cern |
| 6,847,718 B1 | 1/2005 | Hiraoka |
| 6,853,724 B2 | 2/2005 | Wang |
| 6,854,059 B2 | 2/2005 | Gardner |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,868,265 B2 | 3/2005 | Zodnik |
| 6,870,282 B1 | 3/2005 | Bischoff et al. |
| 6,876,648 B1 | 4/2005 | Lee |
| 6,880,020 B1 | 4/2005 | Rubinstein et al. |
| 6,882,714 B2 | 4/2005 | Mansfield |
| 6,885,674 B2 | 4/2005 | Hunt et al. |
| 6,886,181 B1 | 4/2005 | Dodds et al. |
| 6,889,095 B1 | 5/2005 | Eidson et al. |
| 6,891,881 B2 | 5/2005 | Trachewsky et al. |
| 6,895,089 B2 | 5/2005 | Wang |
| 6,896,551 B2 | 5/2005 | Hauck et al. |
| 6,898,413 B2 | 5/2005 | Yip et al. |
| 6,901,439 B1 | 5/2005 | Bonasia et al. |
| 6,904,134 B2 | 6/2005 | Jeon et al. |
| 6,904,149 B2 | 6/2005 | Keenum et al. |
| 6,906,618 B2 | 6/2005 | Hair, III et al. |
| 6,909,725 B1 | 6/2005 | Chow |
| 6,912,145 B2 | 6/2005 | Hung et al. |
| 6,912,209 B1 | 6/2005 | Thi et al. |
| 6,912,282 B2 | 6/2005 | Karam |
| 6,917,681 B2 | 7/2005 | Robinson et al. |
| 6,922,407 B2 | 7/2005 | Wu |
| 6,925,089 B2 | 8/2005 | Chow et al. |
| 6,934,170 B2 | 8/2005 | Ooishi |
| 6,934,754 B2 | 8/2005 | West et al. |
| 6,937,056 B2 | 8/2005 | Binder |
| 6,940,918 B1 | 9/2005 | Nayler et al. |
| 6,941,364 B2 | 9/2005 | Kim et al. |
| 6,943,683 B2 | 9/2005 | Perret |
| 6,947,287 B1 | 9/2005 | Zansky et al. |
| 6,947,736 B1 | 9/2005 | Shaver et al. |
| 6,952,785 B1 | 10/2005 | Diab et al. |
| 6,954,863 B2 | 10/2005 | Mouton |
| 6,956,462 B2 | 10/2005 | Jetzt |
| 6,956,463 B2 | 10/2005 | Crenella et al. |
| 6,956,826 B1 | 10/2005 | Binder |
| 6,961,303 B1 | 11/2005 | Binder |
| 6,963,559 B2 | 11/2005 | Elo |
| 6,963,936 B2 | 11/2005 | Billington et al. |
| 6,970,538 B1 | 11/2005 | Binder |
| 6,972,688 B2 | 12/2005 | Rapaich |
| 6,973,394 B2 | 12/2005 | Jaeger et al. |
| 6,975,209 B2 | 12/2005 | Gromov |
| 6,975,211 B2 | 12/2005 | Atsuta et al. |
| 6,975,713 B1 | 12/2005 | Smith et al. |
| 6,977,507 B1 | 12/2005 | Pannell et al. |
| 6,980,638 B1 | 12/2005 | Smith et al. |
| 6,985,072 B2 | 1/2006 | Omidi et al. |
| 6,985,713 B2 | 1/2006 | Lehr et al. |
| 6,985,714 B2 | 1/2006 | Akiyama et al. |
| 6,986,071 B2 | 1/2006 | Darshan et al. |
| 6,987,430 B2 | 1/2006 | Wasaki et al. |
| 6,989,733 B2 | 1/2006 | Simonsen et al. |
| 6,989,734 B2 | 1/2006 | Thomas |
| 6,995,657 B2 | 2/2006 | Zalitzky et al. |
| 6,995,658 B2 | 2/2006 | Tustison et al. |
| 6,996,134 B1 | 2/2006 | Renucci et al. |
| 6,996,213 B1 | 2/2006 | De Jong |
| 6,996,458 B2 | 2/2006 | Pincu et al. |
| 6,996,729 B2 | 2/2006 | Volkening et al. |
| 6,998,964 B2 | 2/2006 | Lomax, Jr. et al. |
| 6,999,433 B2 | 2/2006 | Baum |
| 6,999,505 B2 | 2/2006 | Yokoo et al. |
| 7,002,898 B1 | 2/2006 | Lou |
| 7,003,102 B2 | 2/2006 | Kiko |
| 7,006,445 B1 | 2/2006 | Cole et al. |

| | | | |
|---|---|---|---|
| 7,006,523 B2 | 2/2006 | Binder | |
| 7,007,305 B2 | 2/2006 | Carson et al. | |
| 7,009,527 B2 | 3/2006 | Seo | |
| 7,009,946 B1 | 3/2006 | Kardach | |
| 7,010,050 B2 | 3/2006 | Maryanka | |
| 7,012,922 B1 | 3/2006 | Unitt et al. | |
| 7,016,377 B1 | 3/2006 | Chun et al. | |
| 7,023,809 B1 | 4/2006 | Rubinstein et al. | |
| 7,026,730 B1 | 4/2006 | Marshall et al. | |
| 7,026,917 B2 | 4/2006 | Berkman | |
| 7,027,566 B2 | 4/2006 | Bossemeyer, Jr. et al. | |
| 7,030,733 B2 | 4/2006 | Abbarin | |
| 7,031,394 B2 | 4/2006 | Vitenberg | |
| 7,035,270 B2 | 4/2006 | Moore, Jr. et al. | |
| 7,046,983 B2 | 5/2006 | Elkayam et al. | |
| 7,049,514 B2 | 5/2006 | Brandt et al. | |
| 7,050,546 B1 | 5/2006 | Richardson et al. | |
| 7,053,501 B1 | 5/2006 | Barrass | |
| 7,054,303 B2 | 5/2006 | Miyazaki et al. | |
| 7,054,442 B2 | 5/2006 | Weikle | |
| 7,058,174 B2 | 6/2006 | Posthuma | |
| 7,061,142 B1 | 6/2006 | Marshall | |
| 7,068,649 B2 | 6/2006 | Fisher et al. | |
| 7,068,668 B2 | 6/2006 | Feuer | |
| 7,068,682 B2 | 6/2006 | Campbell et al. | |
| 7,068,781 B2 | 6/2006 | Le Creff et al. | |
| 7,072,995 B1 | 7/2006 | Burroughs | |
| 7,079,012 B2 | 7/2006 | Wetmore | |
| 7,079,647 B2 | 7/2006 | Tomobe | |
| 7,081,827 B2 | 7/2006 | Addy | |
| 7,082,141 B2 | 7/2006 | Sharma et al. | |
| 7,085,238 B2 | 8/2006 | McBeath | |
| 7,088,238 B2 | 8/2006 | Karaoguz et al. | |
| 7,089,126 B2 | 8/2006 | Muir | |
| 7,091,849 B1 | 8/2006 | Henry | |
| 7,095,848 B1 | 8/2006 | Fischer et al. | |
| 7,095,849 B2 | 8/2006 | Smith et al. | |
| 7,098,773 B2 | 8/2006 | Berkman | |
| 7,099,368 B2 | 8/2006 | Santhoff et al. | |
| 7,099,707 B2 | 8/2006 | Amin et al. | |
| 7,106,261 B2 | 9/2006 | Nagel et al. | |
| 7,106,721 B1 | 9/2006 | Binder | |
| 7,113,574 B1 | 9/2006 | Haas et al. | |
| 7,116,685 B2 | 10/2006 | Brown et al. | |
| 7,117,272 B2 | 10/2006 | Rimboim et al. | |
| 7,133,423 B1 | 11/2006 | Chow et al. | |
| 7,135,982 B2 | 11/2006 | Lee | |
| 7,136,270 B2 | 11/2006 | Liebenow | |
| 7,136,936 B2 | 11/2006 | Chan et al. | |
| 7,142,560 B2 | 11/2006 | Mansfield | |
| 7,142,563 B1 | 11/2006 | Lin | |
| 7,142,934 B2 | 11/2006 | Janik | |
| 7,143,299 B1 | 11/2006 | Rubinstein et al. | |
| 7,145,439 B2 | 12/2006 | Darshan et al. | |
| 7,145,996 B2 | 12/2006 | Creamer et al. | |
| 7,148,799 B2 | 12/2006 | Cern et al. | |
| 7,149,182 B1 | 12/2006 | Renucci et al. | |
| 7,149,474 B1 | 12/2006 | Mikhak | |
| 7,152,168 B2 | 12/2006 | Boynton et al. | |
| 7,154,381 B2 | 12/2006 | Lang et al. | |
| 7,154,996 B2 | 12/2006 | Strauss | |
| 7,155,214 B2 | 12/2006 | Struthers et al. | |
| 7,155,622 B2 | 12/2006 | Mancey et al. | |
| 7,162,013 B2 | 1/2007 | Gavette et al. | |
| 7,162,234 B1 | 1/2007 | Smith | |
| 7,162,377 B2 | 1/2007 | Amrod et al. | |
| 7,162,650 B2 | 1/2007 | Ke et al. | |
| 7,167,078 B2 | 1/2007 | Pourchot | |
| 7,167,923 B2 | 1/2007 | Lo | |
| 7,170,194 B2 | 1/2007 | Korcharz et al. | |
| 7,170,405 B2 | 1/2007 | Daum et al. | |
| 7,171,506 B2 | 1/2007 | Iwamura | |
| 7,176,786 B2 | 2/2007 | Kline et al. | |
| 7,180,412 B2 | 2/2007 | Bonicatto et al. | |
| 7,181,023 B1 | 2/2007 | Andrews et al. | |
| 7,183,902 B2 | 2/2007 | Hamburgen et al. | |
| 7,190,716 B2 | 3/2007 | Norrell et al. | |
| 7,193,149 B2 | 3/2007 | Polanek et al. | |
| 7,194,528 B1 | 3/2007 | Davidow | |
| 7,194,639 B2 | 3/2007 | Atkinson et al. | |
| 7,198,521 B2 | 4/2007 | Hauck et al. | |
| 7,199,699 B1 | 4/2007 | Gidge | |
| 7,199,706 B2 | 4/2007 | Dawson et al. | |
| 7,203,849 B2 | 4/2007 | Dove | |
| 7,203,851 B1 | 4/2007 | Lo et al. | |
| 7,206,322 B1 | 4/2007 | Garg et al. | |
| 7,206,417 B2 | 4/2007 | Nathan | |
| 7,207,846 B2 | 4/2007 | Caveney et al. | |
| 7,209,719 B2 | 4/2007 | Liebenow | |
| 7,209,945 B2 | 4/2007 | Hicks, III et al. | |
| 7,215,763 B1 | 5/2007 | Keller et al. | |
| 7,221,261 B1 | 5/2007 | Klingensmith et al. | |
| 7,224,272 B2 | 5/2007 | White, II et al. | |
| 7,225,345 B2 | 5/2007 | Korcharz et al. | |
| 7,231,535 B2 | 6/2007 | Le Creff et al. | |
| 7,239,627 B2 | 7/2007 | Nattkemper et al. | |
| 7,239,628 B1 | 7/2007 | Pendleton et al. | |
| 7,240,224 B1 | 7/2007 | Biederman | |
| 7,242,729 B1 | 7/2007 | Heistermann et al. | |
| 7,245,625 B2 | 7/2007 | Manis et al. | |
| 7,247,793 B2 | 7/2007 | Hinkson et al. | |
| 7,254,734 B2 | 8/2007 | Lehr et al. | |
| 7,256,684 B1 | 8/2007 | Cafiero et al. | |
| 7,256,704 B2 | 8/2007 | Yoon et al. | |
| 7,257,106 B2 | 8/2007 | Chen et al. | |
| 7,257,108 B2 | 8/2007 | Cheston et al. | |
| 7,263,362 B1 | 8/2007 | Young et al. | |
| 7,265,664 B2 | 9/2007 | Berkman | |
| 7,266,344 B2 | 9/2007 | Rodriguez | |
| 7,272,669 B2 | 9/2007 | Mattur et al. | |
| 7,274,669 B2 | 9/2007 | Czerwiec et al. | |
| 7,276,915 B1 | 10/2007 | Euler et al. | |
| 7,280,032 B2 | 10/2007 | Aekins et al. | |
| 7,281,141 B2 | 10/2007 | Elkayam et al. | |
| 7,283,554 B2 | 10/2007 | Ophir et al. | |
| 7,292,859 B2 | 11/2007 | Park | |
| 7,293,103 B1 | 11/2007 | Lin et al. | |
| 7,299,287 B1 | 11/2007 | Rubinstein et al. | |
| 7,299,368 B2 | 11/2007 | Peker et al. | |
| 7,301,940 B1 | 11/2007 | Bernstein | |
| 7,305,006 B1 | 12/2007 | Bella | |
| 7,307,510 B2 | 12/2007 | Berkman | |
| 7,308,086 B2 | 12/2007 | Yoshitani | |
| 7,310,355 B1 | 12/2007 | Krein et al. | |
| 7,316,586 B2 | 1/2008 | Anderson et al. | |
| 7,319,717 B2 | 1/2008 | Zitting | |
| 7,323,968 B2 | 1/2008 | Iwamura | |
| 7,324,824 B2 | 1/2008 | Smith et al. | |
| 7,327,765 B1 | 2/2008 | Ojard | |
| 7,330,695 B2 | 2/2008 | Karschnia et al. | |
| 7,331,819 B2 | 2/2008 | Nelson | |
| 7,339,458 B2 | 3/2008 | Cern | |
| 7,340,051 B2 | 3/2008 | Phillips et al. | |
| 7,340,509 B2 | 3/2008 | Daum et al. | |
| 7,343,506 B1 | 3/2008 | Fenwick | |
| 7,345,998 B2 | 3/2008 | Cregg et al. | |
| 7,346,071 B2 | 3/2008 | Bareis | |
| 7,349,325 B2 | 3/2008 | Trzeciak et al. | |
| 7,353,407 B2 | 4/2008 | Diab et al. | |
| 7,356,588 B2 | 4/2008 | Stineman, Jr. et al. | |
| 7,363,525 B2 | 4/2008 | Biederman et al. | |
| 7,368,798 B2 | 5/2008 | Camagna et al. | |
| 7,373,528 B2 | 5/2008 | Schindler | |
| 7,375,445 B1 | 5/2008 | Smith | |
| 7,376,734 B2 | 5/2008 | Caveney | |
| 7,380,044 B1 | 5/2008 | Liburdi | |
| 7,382,786 B2 | 6/2008 | Chen et al. | |
| 7,401,239 B2 | 7/2008 | Chan et al. | |
| 7,404,091 B1 | 7/2008 | Gere | |
| 7,404,094 B2 | 7/2008 | Lee et al. | |
| 7,406,094 B2 | 7/2008 | Propp et al. | |
| 7,406,536 B2 | 7/2008 | Efrati et al. | |
| 7,406,614 B2 | 7/2008 | Peleg et al. | |
| 7,408,949 B2 | 8/2008 | Baum | |
| 7,413,471 B2 | 8/2008 | Chan | |
| 7,436,842 B2 * | 10/2008 | Binder | 370/401 |
| 7,489,709 B2 | 2/2009 | Binder | |
| 7,542,554 B2 * | 6/2009 | Binder | 379/90.01 |

| | | | |
|---|---|---|---|
| 7,889,720 B2 * | 2/2011 | Binder .......................... 370/352 |
| 7,911,992 B2 * | 3/2011 | Binder .......................... 370/318 |
| 7,990,908 B2 * | 8/2011 | Binder .......................... 370/318 |
| 8,092,258 B2 * | 1/2012 | Binder .......................... 439/638 |
| 8,351,582 B2 * | 1/2013 | Binder ...................... 379/93.08 |
| 8,360,810 B2 * | 1/2013 | Binder .......................... 439/638 |
| 8,363,797 B2 * | 1/2013 | Binder ...................... 379/90.01 |
| 2001/0030950 A1 | 10/2001 | Chen et al. |
| 2001/0038635 A1 | 11/2001 | Rogers |
| 2001/0039660 A1 | 11/2001 | Vasilevsky et al. |
| 2001/0047418 A1 | 11/2001 | White |
| 2002/0006137 A1 | 1/2002 | Rabenko et al. |
| 2002/0011923 A1 | 1/2002 | Cunningham et al. |
| 2002/0015489 A1 | 2/2002 | Ben-David |
| 2002/0021465 A1 | 2/2002 | Moore, Jr. et al. |
| 2002/0024424 A1 | 2/2002 | Burns et al. |
| 2002/0031114 A1 | 3/2002 | Terry et al. |
| 2002/0035624 A1 | 3/2002 | Kim |
| 2002/0037004 A1 | 3/2002 | Bossemeyer et al. |
| 2002/0039388 A1 | 4/2002 | Smart et al. |
| 2002/0056116 A1 | 5/2002 | Smith |
| 2002/0057581 A1 | 5/2002 | Nadav |
| 2002/0059634 A1 | 5/2002 | Terry et al. |
| 2002/0061012 A1 | 5/2002 | Thi et al. |
| 2002/0063584 A1 | 5/2002 | Molenda et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0080010 A1 | 6/2002 | Zhang |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0114325 A1 | 8/2002 | Dale et al. |
| 2002/0116720 A1 | 8/2002 | Terry et al. |
| 2002/0118823 A1 | 8/2002 | Tomobe |
| 2002/0128009 A1 | 9/2002 | Boch et al. |
| 2002/0144159 A1 | 10/2002 | Wu et al. |
| 2002/0145509 A1 | 10/2002 | Karny et al. |
| 2002/0150100 A1 | 10/2002 | White et al. |
| 2002/0150155 A1 | 10/2002 | Florentin et al. |
| 2002/0154629 A1 | 10/2002 | Lohman et al. |
| 2002/0159402 A1 | 10/2002 | Binder |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0176567 A1 | 11/2002 | Chen et al. |
| 2002/0180592 A1 | 12/2002 | Gromov |
| 2002/0188762 A1 | 12/2002 | Tomassetti et al. |
| 2002/0194383 A1 | 12/2002 | Cohen et al. |
| 2002/0194605 A1 | 12/2002 | Cohen et al. |
| 2002/0198952 A1 | 12/2002 | Bell |
| 2003/0006881 A1 | 1/2003 | Reyes |
| 2003/0016794 A1 | 1/2003 | Brothers |
| 2003/0035556 A1 | 2/2003 | Curtis et al. |
| 2003/0046377 A1 | 3/2003 | Daum et al. |
| 2003/0048895 A1 | 3/2003 | Kiko et al. |
| 2003/0058085 A1 | 3/2003 | Fisher et al. |
| 2003/0061522 A1 | 3/2003 | Ke et al. |
| 2003/0062990 A1 | 4/2003 | Schaeffer, Jr. et al. |
| 2003/0066082 A1 | 4/2003 | Kliger et al. |
| 2003/0067910 A1 | 4/2003 | Razazian et al. |
| 2003/0088706 A1 | 5/2003 | Chan et al. |
| 2003/0090368 A1 | 5/2003 | Ide et al. |
| 2003/0099076 A1 | 5/2003 | Elkayam et al. |
| 2003/0099228 A1 | 5/2003 | Alcock |
| 2003/0103521 A1 | 6/2003 | Raphaeli et al. |
| 2003/0107269 A1 | 6/2003 | Jetzt |
| 2003/0112965 A1 | 6/2003 | McNamara et al. |
| 2003/0133473 A1 | 7/2003 | Manis et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0179869 A1 | 9/2003 | Yoshitani |
| 2003/0194912 A1 | 10/2003 | Ferentz |
| 2003/0198246 A1 | 10/2003 | Lifshitz et al. |
| 2003/0198341 A1 | 10/2003 | Smith et al. |
| 2003/0204393 A1 | 10/2003 | Czerwiec et al. |
| 2003/0206623 A1 | 11/2003 | Deichstetter et al. |
| 2003/0207696 A1 | 11/2003 | Willenegger et al. |
| 2003/0207697 A1 | 11/2003 | Shpak |
| 2004/0006484 A1 | 1/2004 | Manis et al. |
| 2004/0013098 A1 | 1/2004 | Tseng et al. |
| 2004/0037317 A1 | 2/2004 | Zalitzky et al. |
| 2004/0073597 A1 | 4/2004 | Caveney et al. |
| 2004/0083262 A1 | 4/2004 | Trantow |
| 2004/0087214 A1 | 5/2004 | Cho |
| 2004/0090984 A1 | 5/2004 | Saint-Hilaire et al. |
| 2004/0105539 A1 | 6/2004 | Auzizeau et al. |
| 2004/0107299 A1 | 6/2004 | Lee et al. |
| 2004/0107445 A1 | 6/2004 | Amit |
| 2004/0121648 A1 | 6/2004 | Voros |
| 2004/0130413 A1 | 7/2004 | Mentz et al. |
| 2004/0136373 A1 | 7/2004 | Bareis |
| 2004/0136384 A1 | 7/2004 | Cho |
| 2004/0136388 A1 | 7/2004 | Schaff |
| 2004/0146061 A1 | 7/2004 | Bisceglia et al. |
| 2004/0147232 A1 | 7/2004 | Zodnik |
| 2004/0156513 A1 | 8/2004 | Kaylor et al. |
| 2004/0164619 A1 | 8/2004 | Parker et al. |
| 2004/0170262 A1 | 9/2004 | Ohno |
| 2004/0172658 A1 | 9/2004 | Rakib et al. |
| 2004/0177167 A1 | 9/2004 | Iwamura et al. |
| 2004/0178888 A1 | 9/2004 | Hales et al. |
| 2004/0180573 A1 | 9/2004 | Chen |
| 2004/0198236 A1 | 10/2004 | Paine et al. |
| 2004/0204040 A1 | 10/2004 | Heijnen |
| 2004/0208167 A1 | 10/2004 | Kishida |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0250273 A1 | 12/2004 | Swix et al. |
| 2004/0268160 A1 | 12/2004 | Atkinson et al. |
| 2005/0015805 A1 | 1/2005 | Iwamura |
| 2005/0018766 A1 | 1/2005 | Iwamura |
| 2005/0038875 A1 | 2/2005 | Park |
| 2005/0047379 A1 | 3/2005 | Boyden et al. |
| 2005/0053087 A1 | 3/2005 | Pulyk |
| 2005/0063108 A1 | 3/2005 | Voll et al. |
| 2005/0063403 A1 | 3/2005 | Binder |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0078700 A1 | 4/2005 | Thompson et al. |
| 2005/0083959 A1 | 4/2005 | Binder |
| 2005/0086389 A1 | 4/2005 | Chang |
| 2005/0086694 A1 | 4/2005 | Hicks et al. |
| 2005/0097369 A1 | 5/2005 | Bowser et al. |
| 2005/0114325 A1 | 5/2005 | Liu et al. |
| 2005/0125083 A1 | 6/2005 | Kiko |
| 2005/0125507 A1 | 6/2005 | Atias et al. |
| 2005/0136972 A1 | 6/2005 | Smith et al. |
| 2005/0136989 A1 | 6/2005 | Dove |
| 2005/0150100 A1 | 7/2005 | Merdan et al. |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0201306 A1 | 9/2005 | Engel |
| 2005/0220021 A1 | 10/2005 | Sosnowski et al. |
| 2005/0226200 A1 | 10/2005 | Askildsen et al. |
| 2005/0239400 A1 | 10/2005 | Narikawa |
| 2005/0245127 A1 | 11/2005 | Nordin et al. |
| 2005/0268120 A1 | 12/2005 | Schindler et al. |
| 2005/0268322 A1 | 12/2005 | Watson |
| 2005/0280598 A1 | 12/2005 | Webb et al. |
| 2005/0281326 A1 | 12/2005 | Yu |
| 2006/0007945 A1 | 1/2006 | Schoettle et al. |
| 2006/0017324 A1 | 1/2006 | Pace et al. |
| 2006/0029210 A1 | 2/2006 | Feugere |
| 2006/0034449 A1 | 2/2006 | Joerger |
| 2006/0053324 A1 | 3/2006 | Giat et al. |
| 2006/0056444 A1 | 3/2006 | Binder |
| 2006/0067521 A1 | 3/2006 | Muise et al. |
| 2006/0089230 A1 | 4/2006 | Biederman et al. |
| 2006/0118561 A1 | 6/2006 | Wang et al. |
| 2006/0133588 A1 | 6/2006 | Binder |

| | | | |
|---|---|---|---|
| 2006/0140178 | A1 | 6/2006 | Cheng et al. |
| 2006/0140260 | A1 | 6/2006 | Wasaki et al. |
| 2006/0153169 | A1 | 7/2006 | Koifman et al. |
| 2006/0165097 | A1 | 7/2006 | Caveney |
| 2006/0168459 | A1 | 7/2006 | Dwelley et al. |
| 2006/0181398 | A1 | 8/2006 | Martich et al. |
| 2006/0193310 | A1 | 8/2006 | Landry et al. |
| 2006/0193313 | A1 | 8/2006 | Landry et al. |
| 2006/0197387 | A1 | 9/2006 | Hung et al. |
| 2006/0203981 | A1 | 9/2006 | Binder |
| 2006/0215680 | A1 | 9/2006 | Camagna |
| 2006/0222086 | A1 | 10/2006 | Frye, Jr. |
| 2006/0238250 | A1 | 10/2006 | Camagna et al. |
| 2006/0251094 | A1 | 11/2006 | Van Vleck et al. |
| 2006/0251159 | A1 | 11/2006 | Huotari et al. |
| 2006/0251179 | A1 | 11/2006 | Ghoshal |
| 2006/0262727 | A1 | 11/2006 | Caveney |
| 2006/0269001 | A1 | 11/2006 | Dawson et al. |
| 2006/0280197 | A1 | 12/2006 | Stone |
| 2006/0291493 | A1 | 12/2006 | Schley-May et al. |
| 2007/0025368 | A1 | 2/2007 | Ha et al. |
| 2007/0036171 | A1 | 2/2007 | Magin |
| 2007/0041577 | A1 | 2/2007 | Ghoshal et al. |
| 2007/0058666 | A1 | 3/2007 | Pratt |
| 2007/0082649 | A1 | 4/2007 | Chan |
| 2007/0083668 | A1 | 4/2007 | Kelsey et al. |
| 2007/0086444 | A1 | 4/2007 | Binder |
| 2007/0112939 | A1 | 5/2007 | Wilson et al. |
| 2007/0167144 | A1 | 7/2007 | Koga et al. |
| 2007/0198748 | A1 | 8/2007 | Ametsitsi et al. |
| 2007/0206629 | A1 | 9/2007 | Choi |
| 2007/0206749 | A1 | 9/2007 | Pincu et al. |
| 2007/0208961 | A1 | 9/2007 | Ghoshal et al. |
| 2007/0213879 | A1 | 9/2007 | Iwamura |
| 2007/0220618 | A1 | 9/2007 | Holmes et al. |
| 2007/0236853 | A1 | 10/2007 | Crawley |
| 2007/0254714 | A1 | 11/2007 | Martich et al. |
| 2007/0260904 | A1 | 11/2007 | Camagna et al. |
| 2008/0013612 | A1 | 1/2008 | Miller et al. |
| 2008/0013637 | A1 | 1/2008 | Kodama et al. |
| 2008/0058018 | A1 | 3/2008 | Scheinert |
| 2008/0125187 | A1 | 5/2008 | Chang et al. |
| 2008/0136915 | A1 | 6/2008 | Iwamura |
| 2008/0140565 | A1 | 6/2008 | DeBenedetti et al. |
| 2008/0153415 | A1 | 6/2008 | Block et al. |
| 2008/0165463 | A1 | 7/2008 | Chan |
| 2008/0186150 | A1 | 8/2008 | Kao |

FOREIGN PATENT DOCUMENTS

| | | |
|---|---|---|
| DE | 3329336 A1 | 12/1983 |
| EP | 0241152 A2 | 10/1987 |
| EP | 0355532 A2 | 2/1990 |
| EP | 1009156 A2 | 6/2000 |
| EP | 1343253 A2 | 9/2003 |
| GB | 2368979 A | 5/2002 |
| JP | 56087192 A | 7/1981 |
| JP | 57204655 A | 12/1982 |
| JP | 58206257 A | 12/1983 |
| JP | 06006359 | 1/1994 |
| JP | 07336379 A | 12/1995 |
| JP | 09084146 A | 3/1997 |
| JP | 11308352 | 11/1999 |
| JP | 11317968 | 11/1999 |
| JP | 11355435 | 12/1999 |
| WO | 9623377 A1 | 8/1996 |
| WO | 9750193 A1 | 12/1997 |
| WO | 9802985 A1 | 1/1998 |
| WO | 9811699 | 3/1998 |
| WO | 9854901 A1 | 12/1998 |
| WO | 9903255 A1 | 1/1999 |
| WO | 9912330 A1 | 3/1999 |
| WO | 9930242 | 6/1999 |
| WO | 9953627 A1 | 10/1999 |
| WO | 0128215 A1 | 4/2001 |
| WO | 0143238 A1 | 6/2001 |
| WO | 02091652 A2 | 11/2002 |
| WO | 02102019 A2 | 12/2002 |

OTHER PUBLICATIONS

Cisco Systems, Catalyst 5000 Group Switching Ethernet Modules, 5 pages, May 6, 1996.

"Demand Side Management with LonWorks Power Line Transceivers", LonWorks Engineering Bulletin, Echelon Corporation, 36 pages, Dec. 1, 1996.

Yamamoto, Kazuyuki et al, "A Home Terminal System Using the Home Area Information Network", IEEE Transactions on Consumer Electronics, vol. CE-30, No. 4, pp. 608-616, Nov. 1, 1984.

"Ascend DSLPipe-S Specifications", 1997, 2 pages.

Andrews, S.B., "The Generic Digital Channel Concept", IEEE International Conference on Communications, Chicago IL, pp. 7.1.1-7.1.3, Jun. 23, 1985.

Cooper, Edward, "Broadband Network Technology—An Overview for the data and Telecommunications Industries", Sytek Systems, Mountain View CA, 4 pages, Jan. 1, 1984.

Punj, V., "Broadband Applications and Services of Public Switched Networks", IEEE Transactions on Consumer Electronics, vol. 35, No. 2, 8 pages, May 1, 1989.

"Home Phoneline Networking Alliance", Interface Specification for Home PNA 2.0 10 M8 Technology Link Layer Protocol, pp. 1-39, pp. 1-78, Dec. 1, 1999.

Freeman, Roger L., "Telecommunication Transmission Handbook" 2. sup.nd.Ed., Cover, A Wiley-Interscience Publication;, pp. xi-xxvii, Chapter 3 (pp. 79-127), Chapter 5 (pp. 172-252), Chapter 6 (pp. 253-288), Jan. 1, 1981.

"JVC Introduces First Ethernet Compatible Wireless LAN System"; Business Wire, 1 page, Nov. 7, 1995.

Cisco Systems, "CiscoPro EtherSwitch CPW2115", 4 pages, Dec. 1, 1995.

"Intelogis to Present on Stage at Internet Showcase 1998" PR Newswire, 1 pages, Jan. 28, 1998.

Olshansky, Robert, "Broadband Digital Subscriber Line: A Full Service Network for the Copper Plant", Telephony, pp. 52-60, Jun. 12, 1985.

Merrow, Jack K., "A New Approach to Integrating Local Area Data and Voice Transmission", Telephony, vol. 250, No. 17, 2 pages, Oct. 1, 1983.

Vry, M.G. et al, "Digital 1+1 Systems for Local Network Enhancement", Conference on Communications Equipment and Systems, Birmingham, UK. , pp. 61-64, Apr. 20, 1982.

Fukagawa, H. et al, "Bus Wiring System for Residences", Matsushita Electric Works Technical Report, No. 36, pp. 31-35, Feb. 1, 1988.

Brosio, Alberto et al, "A Comparison of Digital Subscriber Line Transmission Systems Employing Different Line Codes", IEEE Transactions on Communications, vol. COM-29, No. 11, pp. 1581-1588, Nov. 1, 1981.

Advanced Micro Devices, Inc. et al, "An Interoperable Solution for FDDI Signaling Over Shielded Twisted Pair", Advanced Micro Devices Inc. , pp. 1-18, May 21, 1991.

"SuperStack II Baseline Switch User Guide", 3Com, 8 pages, Mar. 1, 1998.

"LonWorks for Audio Computer Control Network Applications", Echelon Corporation, 30, Jan. 1, 1995.

Hoe-Young, Noh, "Home Automation", Korea Information Science Society Review, vol. 7 No. 2 pp. 40-44, Republic of Korea., 1-14, Apr. 1, 1989.

"LonWorks 78kbps Self-Healing Ring Architecture", LonWorks Marketing Bulletin, Echelon Coporation, 6 pages, Aug. 1, 1993.

Bienz, Albert, "1+1+32 1—Oder Das Telefonnetz Als Datennetz", Sysdata, vol. 16, pp. 41-42, Sep. 1, 1985.

Alves, John, "Data Over Voice—A Low Cost LAN Alternative", Communications Show and Conference, MECOM '87, pp. 13-15, Jan. 1, 1987.

Agazzi, O. et al, "Large Scale Integration of Hybrid-Method Digital Subscriber Loops", IEEE Transactions on Communications, vol. COM-30, No. 9, pp. 2095-2108, Sep. 1, 1982.

"*Serconet Ltd* V *Netgear Inc*" Case No. CV-06-04646 PJH Claim Comparison Chart for USP 7,016,368, 1-105, Jan. 29, 2007.

"Ethernet Wireless LAN Systems"; Byte, 3 pages, Feb. 1, 1996.

Donnan, Robert et al, "Token Ring Access Method and Physical Layer Specifications", ANSI/IEEE Standard for Local Area Networks, 44 pages, Apr. 29, 1985.

Adaptive Networks, Inc., "AN1000 Powerline Network Communications Chip Set", 1-29 pages, Jan. 1, 1995.

3Com, "3Com Product Details, NBX 2101PE Basic Phone", pp. 1-3, Jan. 18, 2007.

Sodeyama T, et al, "Intelligent House", Journal of the Institute of Electronics, Information and Communication Engineers, vol. 72, No. 9, pp. 1024-1026, Sep. 1, 1989.

Cisco Systems, "Catalyst 5000 Series", Cisco Systems, 1996, pp. 589-600.

"Introduction to Pyxos FT Platform", Echelon Corporation 2007, 34 pages, Jan. 1, 2007.

Anderson, Milton M., "Video Services on Copper", Conference : ICC 91, International Conference on Communications Conference Record. Denver, CO, pp. 302-306, Jun. 23, 1991.

Pernin, Jean-Louis, "Related Evolution of Subscriber Loop Plant and Residential Data Transmission Needs", Intelcon '79 Exposition Proceedings, Dallas, TX, pp. 596-599, Feb. 26, 1979.

Karia, Arvind J. et al, "A Digital Subscriber Carrier System for the Evolving Subscriber Loop Network", IEEE Transactions on Communications, vol. COM-30, No. 9, pp. 2012, 2014, 2015, Sep. 1, 1982.

"Data Carrier System Allows Simultaneous Voice/Data Transmission for PABX Telephone Systems", Computer Design, vol. 21, No. 5, pp. 68 and 70, May 1, 1982.

"SuperStack II Desktop Switch User Guide"; 3Com, 148 pages, Jun. 1, 1997.

Weiss, Martin B.H. et al., Internet Telephony or Circuit Switched Telephony: Which is Cheaper?, 1-25, Dec. 11, 1998.

Bisaglia, Paola et al, "Receiver Architectures for Home PNA 2.0", Hewlett Packard Laboratories, Bristol UK, 1-6, Oct. 17, 2001.

Vry, M.G. et al, "The Design of 1+1 System for Digital Signal Transmission to the Subscriber", NTG-Bachberichte, vol. 73, pp. 36-40, 36-40, Jan. 1, 1980.

Metcalfe, Bob, From the Ether-Bob Mecalfe, Cheap, reliable 'net connections may be as close as an electrical socket, by Bob Metcalfe Info World, vol. 19, Issue 6, 4 pages, Feb. 10, 1997.

N/A, "SuperStack II Baseline 10/100 Switch User Guide", 3Com, pp. 1-8, May 1, 1998.

Twisted Pair Physcial Layer and Medium Specification Revision: IS-60 Aug. 18, 1995, EIA-600.32, 49 pages, Aug. 18, 1995.

IEEE Standard for a High Perfomance Serial Bus; IEEE Std. 1394-1995, 392 pages, Jul. 22, 1996.

Loh, L, Ozturk, Y., Quality of Support and Priority Management in Home PNA 2.0 Link Layer, quadrature.. quadrature. Computers and Communications (ISCC 2003). Proceedings Eighth IEEE International Symposium, vol. 2, pp. 861-866, Jun. 30, 2003.

Tsuda, Toru et al, "Experimental In-House Multiservice Communication System", Fujistu Scientific and Technical Journal, vol. 16, No. 3, pp. 29-45, Sep. 1, 1980.

"Instant Network Rides on Phone Lines", Electronic Design, 1, Jan. 1, 1987.

Yamamoto, K. et al, "New Home Telephone System Using Japanese Home Bus System Standard", IEEE Transactions on Consumer Electronics, vol. 35, No. 3, pp. 687-697, Aug. 1, 1989.

RAD Data Comm. Ltd., "Token Ring Design Guide", #TR-20-01/94, chapters 1 through 4-21, Jan. 1, 1994.

"PowerDsine Product Catalogue" Israel, pp. 56-79 and 95-105, Jan. 1, 1999.

LonWorks Custom Node Development, LonWorks Engineering Bulletin, Echelon Corporation, 16 pages, Jan. 1, 1995.

Treves, S.R. et al, "Text, Image and Data Integration in a Distributed Control Digital Voice Switching System", International Switching Symposium—ISS '81 CIC, Montreal, QC Canada, pp. 1-7, Sep. 21, 1981.

Strole, N., "The IBM Token-Ring Network—A functional Overview", IEEE Network Magazine, vol. 1, No. 1, pp. 23-30, Jan. 1, 1987.

Cornell Ronald G. et al, "Progress Towards Digital Subscriber Line Services and Signaling", IEEE Transactions on Communications, vol. COM-29, No. 11, pp. 1589-1594, Nov. 1, 1981.

"Universal Serial Bus Specification Revision 1.0." Sec. 9.2.1-9.2.5.1 pp. 170-171, Jan. 15, 1996.

"Computerized Telephone System Integrates Voice and Data Switching", Computer Design, vol. 20, No. 4,, 6 pages, Apr. 1, 1981.

Cisco, "Cisco Catalyst 5000 Family Fast EtherChannel Switching Modules Data Sheets", 3 pages, Jan. 1, 1999.

"LonWorks Twisted Pair Control Module User's Guide Version 2", Echelon Corporation, 1992-1996, 50 pages, Jan. 1, 1996.

Ulm, John et al, Data-Over-Cable Interface Specifications/Radio Frequency Interface Specification, SP-RFII01-970326, 1-189, Mar. 26, 1997.

Lavoisard, J.L., "ISDN Customer Equipments", Commutation and Transmission, No. 3, pp. 35-50, Jan. 1, 1987.

Dougligeris C. et al, "Communications and Control for a Home Automation System", Conference IEEE Proceedings of the Southeastcon '91, vol. 1, pp. 171-175, Jan. 1, 1991.

"DSLPipe User's Guide"; by Ascend Communications, 245 pages, Jun. 3, 1997.

"*Serconet Ltd V Netgear Inc*" Case No. CV-06-04646 PJH, Order Construing Claims, 1-27, Jul. 30, 2007.

Held, Gilbert, "High Speed Networking with LAN Switches",, pp. 1-290, Jan. 1, 1997.

Valenti, C., "Study of the Feasibility and Advisability of Digital Subscriber Lines Operating at Rates Substantially in Excess of the Basic Access Rate", T1E1.r Technical Subcommittee (T1E.4/91-115) pp. 2 and 4., Aug. 26, 1991.

"Continuation of IBM LAN Bridge and Switch Summary", Jan. 1996, 1-70.

Boubekker, Mansouria, "Bandwidth Reduction for the Transmission of Sign Language Over Telephone Lines", Proceedings of the SPIE—The International Society for Optical Engineering, vol. 1001, Part 1, pp. 223-230, Nov. 9, 1988.

"Information on Home PhoneLine Networking Alliance (Home PNA)", dated Jun. 1998 and before. , 1-52, Jun. 1, 1998.

"Centex LAN Can Provide Advanced Network Capabilities Over the Existing Telephone Wires", Communications News. vol. 25, No. 6, p. 27, Jun. 1, 1988.

Motoyama, Shusaburo et al, "A Subscriber Loop Multiplexing System for Integrated Service Digital Networks" Conference : NTC '81, IEEE 1981 National Telecommunications Conference, Innovative Telecommunications—Key to the Future, New Orleans LA, 6 pages, Nov. 29, 1981.

"IBM LAN Bridge and Switch Summary", Jan. 1996, 208 pages.

Mitel, ISO-CMOS ST-Bus Family, MT8971B/72B; Digital Subscriber Interface Circuit/Digital Network Interface Circuit; Issue 7, pp. 1-21, May 1, 1995.

Evans, Grayson , "The CEBus Standard Users Guide, 1st Edition", 317 pages, pp. 1-317, May 1, 1996.

Ogiwara, Haruo et al, "Design Philosophy and Hardware Implementaion for Digital Subscriber Loops", IEEE Transactions on Communications, vol. COM-30, No. 9, pp. 2057-2065, Sep. 1, 1982.

Azzam, Albert, A., "High Speed Cable Modems: Including IEEE 802.14 Standards", pp. 1-597, Jan. 1, 1997.

Cisco Systems, "Catalyst 5000 Series Configuration Worksheet", pp. 1-11, Jan. 1, 1996.

Held, Gilbert, "The Complete Modem Reference: The Technician's Guide to Installation, Testing, and Trouble-Free Communications", Third Edition, pp. 1-488, Jan. 1, 1997.

Davis, Steve, "Integrating Voice and Data: A Marriage of Convenience", Today's Office, vol. 24, No. 9, pp. 28-30, Feb. 1, 1990.

Pietrasik, A. et al, "Subscriber Carrier Telephony System 1+1", Wiadomosci Telekomunikacyjne, vol. 17, No. 7-8, pp. 193-198, Jul. 1, 1977.

Echelon Corporation, "Centralized Commercial Building Applications with the LonWorks PLT-21 Power Line Transceiver", LonWorks Engineering Bulletin, Echelon Corporation, 22 pages, Apr. 1, 1997.

Kosiur Dave,et al, "Macworld Networking Bible", Second Edition, pp. 332-687, Jan. 1, 1994.

Coronaro, M. et al, "Integrated Office Communication System" Electrical Communication, vol. 60, No. 1, Face Research Center, Pomezia, Italy, pp. 17-22, Jan. 1, 1986.

Waring, D.L., "The Asymmetrical Digital Subscriber Line (ADSL): A New Transport Technology for Delivering Wideband Capabilities to the Residence" Globecom '91, IEEE, pp. 1979-1986, Jan. 1, 1991.
"Phoneline/HPNA/Home PNA Networks", 1-3, Jul. 29, 2003.
Byrne, Thomas P. et al, "Positioning the Subscriber Loop Network for Digital Services", IEEE Transactions on Communications, vol. COM-30, No. 9, pp. 2006-2011, Sep. 1, 1982.
Cisco Systems, "Catalyst 5000 ATM LAN Emulation Module: Data Sheer", 2 pages, Nov. 1, 1995.
Bastian, M., "Voice-Data Integration: An Architecture Perspective", IEEE Communications Magazine, vol. 24, No. 7, pp. 8-12, Jul. 1, 1986.
"Fast Ethernet 100 Mbps Solutions", Posted March, 10 pages, Mar. 1, 1996.
Stallings, W., "Local Networks—An Introduction", pp. ii, xii-xvi, 373-381, Jan. 1, 1984.
Amodei, Aurelio et al, "Increasing the Throughput of the HomePNA Mac Protocol" Proceedings of the 29th Annual IEEE International Conference on Local Computer Networks (LCN '04), 8 pages, Nov. 1, 2004.
Cisco Systems, "Cisco Catalyst 5002 Switching System", 1999, 4 pages.
Perlman, Radia, "Interconnections Bridges and Routers", ISBN: 0-201-56332-0, 393 pages, Jan. 1, 1992.
Markwalter, Brian E. et al, CEBus Router Testing, IEEE Transactions on Consumer Electronics, vol. 37, No. 4, 8 pages, Nov. 1, 1991.
Carse, G.D., "New and Future Technologies in the Local Telephone Network: The Victoiria System", Conference IEEE International Conference on Communications'86, Integrating the World Through Communications Conference Record , Toronto ON Canada, pp. 410-412, Jun. 22, 1986.
Neumann, Gerd, "Flexible and Cost-Minimising System Concept" (Ericsson Digital PABX MD 110), Net Nechrichten Elektronik-Telematik, Special Issue, 5 pages, Mar. 1, 1988.
Network Based Exchange—The Complete Communications Solution, NBX Corporation, 16 pages, Jan. 1, 1997.
Gibson, Richard et al, Fiber Distributed Data Interface (FDDI)—Token Ring Physical Layer Medium Dependent (PMD); Americal National Standard for Intormation Systems; ANSI X3.166, 1-57, Jan. 1, 1990.
Hughes, John B. et al, "A Receiver IC for a 1+1 Digital Subscriber Loop", IEEE Journal of Solid-State Circuitry, vol. S.C. 20, No. 3, pp. 671-678, Jun. 1, 1985.
Nichols, Keith, "Line Carrier Modems—2: Build a Pair of Line-Carrier Modems (Part 2)", Radio Electronics , 5 total pages, Aug. 1, 1988.
Echelon Corporation, "Building a Lon Talk-to-PLC Gateway", Lon Works Engineering Bulletin, 1-63, May 1, 1994.
"LTM-10A User's Guide", Revision 4, Echelon Coporation, 1995-2001, 46 pages, Jan. 1, 2010.
"The Mac Reborn", Macworld, vol. 13, Issue 9., pp. 1-10, Sep. 1, 1996.
Matthews, Tom, "Telecomm System is Nerve Center", Infosystems, vol. 31, No. 5, pp. 68-69, May 1, 1984.
Bearfield, J.M., "Control the Power Interface of USB's Voltage Bus", Electronic Design, U.S. Penton Publishing, Clev. Ohio, vol. 45, No. 15, pp. 80, 82, 84 and 86, Jul. 1, 1997.
Stallings, W., "Local Networks—Third Edition", pp. I-v, x-xvi, 499-510, Jan. 1, 1990.
"SuperStack II Desktop Switch", 3Com, 1-2, Sep. 1, 1996.
"Motorola Announces Key New Features to CyberSURFR Cable Modem System", Motorola, 3 pages, Mar. 17, 1997.
"PL3120/PL3150 Power Line Smart Transceiver Data Book", Version 2, Echelon Corporation, 1996-2005, 255 pages, Jan. 1, 1996.
"Superstack II Baseline Switch 610 User Guide", 3Com, pp. 1-54, May 1, 1999.
Adaptive Networks, Inc., "AN1000EVK Evaluation Unit Manual, Draft 1.0", 31 pages, Aug. 1, 1996.
SX-200 Digital PABX/Features Description 9109-094-105-NA, Issue 4, Revision 1, pp. 1-350, Nov. 1, 1990.
Cisco Systems, "Catalyst 5000 ATM Dual PHY LAN Emulation Module", pp. 1-4, Sep. 24, 1996.

Kosiur Dave et al, "Macworld Networking Bible", Second Edition, pp. 1-331, Jan. 1, 1994.
Azzam, Albert, A. , "High Speed Cable Modems", 1997, ISBN: 0-07-006417-2 pp. 247-570, 247-570, Jan. 1, 1997.
"Introduction to the CEBus Standard", Revision 2-5-95 , EIA-600. 10, Draft Copy, 19 pages, Feb. 5, 1995.
Schwartz, Jeffrey, "Commtek Intros Video Over UTP", Communications Week, 3 pages, Feb. 10, 1992.
Glick, David et al, "Providing Telco Customers Continuous Data Services", Telephony, vol. 205, No. 22, pp. 46, 50, 51, 54, Nov. 1, 1983.
Gunnerson, Gary, "Switching Hubs—Switching to the Fast Track", PC Magazine, 24 pages, Oct. 11, 1994.
"Claim Chart presented in request for reexamination of US Patent No. 5,841,360 request filed", pp. 1-53, Oct. 22, 1996.
Urui, Klyoshi et al, "Integrated Voice/Data Digital EPBX", Toshiba Review, No. 150, Winter 1984,., pp. 30-33, Jan. 1, 1984.
Heite, C et al, "Powernet—Das Neue Eib-Medium, Elektrotechnik und Informationstechnik", Spinger Verlag, Wein, AT, vol. 114,. No. 5, pp. 254-257, Jan. 1, 1997.
Cisco Systems, "Cisco Catalyst 5000: Industry's First Modular, Multilayer-Capable Switching System for the Wiring Closet", pp. 1-22, May 16, 1996.
"Universal Serial Bus Specification Revision 1.0." Sec. 9.6.2 pp. 184-185, Jan. 15, 1996.
Fogarty, Kevin, "ZAP! NetWare users get really wired—over electric power lines", Network World. , 1-2, Jul. 3, 1995.
"AT and T's Systemax Premises Distribution System Solves Networking Problems", Fiber Optics Magazine, vol. 12, No. 4, Jul. 1, 1990.
Artom, A et al, "The Possible Use of Customer Loop for New Services During the Transition From Analogue to Digital", Revue F.I.T. C.E. vol. 20, No. 2, pp. 50-56, Mar. 1, 1981.
Lohse et al, "Fiber Distributed Data Interface (FDDI)—Token Ring Media Access Control (MAC); American National Standards for Information Systems; ANSI X3. 139-1987", 1-64, Nov. 5, 1986.
"SuperStack II Entry Hub User Guide", 3Com, pp. 1-8, Nov. 1, 1996.
Lechleider, J.W., "Study of the Feasibility and Advisability of Digital Subscriber Lines Operating at Rates Substantially in Excess of the Basic Access Rate" T1E1.4 Technical Subcommittee (T1E1.4/89-070), Mar. 13, 1989.
SX-200 Digital PABX/General Description 9109-094-100-NA, Issue 4, Revision 1, pages 1-46, Nov. 1, 1990.
Ascend Communications, Inc., "Ascend DSLPipe-S Features", 2 pages, May 12, 1997.
"PassPort PC Plug In Quick Setup Guide", Intelogis P/N 30030202, 1998, 8 pages.
Murakoshi, R., "Home Automation", Journal of the Society of Instrument and Control Engines, vol. 23, No. 11, pp. 955-958, Nov. 1, 1984.
ITU-T 1.430 Integrated Services Digital Network—Basic User-Network Interface—Layer 1 Specification, 1-106, Jan. 1, 1996.
SX-200 Digital and SX-200 Light PABX, General Information Guide Lightware 15, 9109-952-006-NA, Issue 1, Revision 0, pp. 1-222, Mar. 1, 1992.
Tanaka H et al, "Telecontrol Systems VJ-501", National Technical Report, vol. 32, No. 6, pp. 809-817, Dec. 1, 1986.
"Claim Chart presented in request for reexamination of US Patent No. 6,480,510 request filed", pp. 1-37, Jul. 28, 1998.
Nishi, H et al, "Control of a Star/Bus Key Telephone System", NTT R and D, vol. 39, No. 8, pp. 122, 1222, 1224-1228, Jan. 1, 1990.
Van Den Berg, A.F. et al, "Principes van de Modem: Technieken en Specificaties", Elektronica, vol. 32, No. 5, pp. 11, 13, 15, 17, 19 and 21, Mar. 9, 1984.
"Universal Serial Bus Specification", Revision 1.0, 268 total pages, Jan. 15, 1996.
Jelski, Robert, "Subscriber Subcarrier System—A New Life", Communications International, vol. 4, No. 5, pp. 29-30, May 1, 1977.
Mandeville, Robert et al, "Forget the Forklift", Data Communications, 11 pages, Sep. 1, 1996.
"Home Phoneline Networking Alliance", Interface Specification for Home PNA 2.0 10 M8 Technology Link Layer Protocol, pp. 1-77, 1-78, Dec. 1, 1999.

"*Serconet Ltd V Netgear Inc*" Case No. CV-06-04646 PJH, Claim Comparison Chart for USP 6,480,510, 1-37, Jan. 29, 2007.
Bell Communications Research, Bellcore: Request for Information: Asymmetrical Digital Subscriber Line (ADSL) Systems That Support Simplex High-Bit-Rate Access and POTS in the Copper Loop Plant, Jun. 1, 1991.
"Compaq Deskpro 4000S Series of Personal Computers", 1-133, Jul. 1, 1997.
"JVC Introduces Ethernet Compatible Wireless LAN System"; Business Wire, 1 pages, Sep. 25, 1995.
Nichols, Keith, "Line Carrier Modems—1: Build a Pair of Line-Carrier Modems (Part 1)", Radio Electronics, 7 total pages, Jul. 1, 1988.
"Home PNA Specification 1.0 Field Tests Status", Home Phoneline Networking Alliance Inc., pp. 1-6, Mar. 1, 1999.
Hachman, Mark, "Compaq to Ride the CEBus", EBN, 1 page, Jan. 22, 1996.
"LonWorks LPT-10 Link Power Transceiver User's Guide Version 2.1", Echelon Corporation, 60 pages, Jan. 1, 1995.
Hofman, J., "Cable, Television, and the Consumer Electronic Bus":, Panasonic Technologies Inc., 9 Pages, Jun. 11, 1987.
Artom, A. et al, "Medium-Term Prospects for New Services to the Telephone Customers", Conference Record, Intl Conf. on Communications, Denver CO, pp. 14.4-14.4-6, Jun. 14, 1981.'
"Hart Field Communication Protocol—an introduction for users and manufacturers", Hart Communication Foundation, 12 pages, Oct. 1, 1995.
Nash, R.D. et al, "Simultaneous Transmission of Speech and Data Over an Analog Telephone Channel". GLOBECOM '85. IEEE Global Telecommunications Conference, Conference Record. Communicaiton Technology to Provide New Services, New Orleans LA., pp. 4.2.1-4.2.4, Dec. 2, 1985.
Cisco Systems, "Catalyst 5000 Switching System", 1996, pp. 1-4.
Strassberg, Dan, "Home Automation Buses", Protocols Really Hit Home, EDN, 1-9, Apr. 13, 1995.
"The DSL Sourcebook", Paradyne Corporation, DSL—Book-3.0-0900, 98 pages, Jan. 1, 2000.
21145 Phoneline/Ethernet LAN Controller, Intel Corporation Copyright 1999 http://developer.intel.com/design/network/21145.htm, 1-3, Aug. 31, 1999.
"Data Over Voice is Solution for Corporate Network", Telephone Engineer and Management, vol. 91, No. 9, pp. 67-69, May 1, 1987.
Inoue, Masahiro et al, "A Home Automation System", IEEE Transactions on Consumer Electronics, vol. CE-31, No. 3, pp. 516-527, Aug. 1, 1985.
"TeleVideo Brochure" (published before Jul. 3, 1995), 2 pages, Jul. 3, 1995.
3Com, "3ComImpact IQ External ISDN Modem User product brochure", pp. 1-4, Jun. 1, 1996.
*Serconet, Ltd., v. Netgear. Inc.* Case No. CV-06-04646 PJH, Defendant's Invalidity Contentions, 1-15, Jan. 29, 2007.
LAN Emulation, 16 pages, Nov. 15, 1995.
Teshima, A, et al, "Still Video Telecommunications Over the Analog Telephone Network", Journal of the Institute of Television Engineers of Japan, vol. 42, No. 11, pp. 1162-1167, Nov. 1, 1988.
Hightower, N.C., "Integrated Voice, Data and Video in the Local Loop", IEEE 1986, pp. 915-919, Jan. 1, 1986.
SX-200 Digital PABX/Circuit Card Descriptions 9109-094-125-NA, Issue 4, Revision 1, pp. 1-48, Nov. 1, 1990.
Beene, G.W., "Design Considerations for a CO-Powered Distributed-Drop PCM Station Carrier", IEEE Transactions on Communications, vol. COM-30, No. 9, pp. 2022-2028, Sep. 1, 1982.
Gershon, Eugen, "FDDI on Copper with AMD PHY Components"; Advanced Micro Devices Inc., pp. 1-8, Jun. 1, 1991.
Masuda, Tadashi et al, "2-Wire Video Intercom System with Telephone", National Technical Report, vol. 37, No. 6, pp. 74-80, Dec. 1, 1991.
Olshanksy, Robert, "Broadband Digital Subscriber Line: A Full Service Network for the Copper Plant", Telephony, vol. 228, No. 24, 8 pages, Jun. 12, 1995.
Simple, High-Speed Ethernet Technology for the Home, A White Paper, The Home Phoneline Networking Alliance, pp. 1-11, Jun. 1, 1998.
"SuperStack II PS Hub User Guide"; 3Com, 188 pages, Jul. 1, 1997.
Morgan, Hank, "Two-Wire Full-Duplex Modem Simplifies Voice and Data Networking", Mini-Micro Systems, vol. 17, No. 3, 4 pages, Mar. 1, 1984.
Devault, M. et al, "Resaux Domestiques et Terminaux Audiovisuels Numeriques", L'Echo Des Recherches, No. 126, pp. 37-46, Jan. 1, 1986.
Ahamed, Syed V et al, "A Tutorial on Two-Wire Digital Transmission in the Loop Plant", IEEE Transactions on Communications, vol. COM-29, No. 11, pp. 1554-1564, Nov. 1, 1981.
Stallings, W., "Local Networks—Second Edition", pp. I-v, vii-xiv, 427-434, Jan. 1, 1987.
"English Language Abstract for Japanese Patent 1-27358 (64-27358)", whole document, Jan. 30, 1989.
"Technical Report TR-001 ADSL Forum System Reference Model", 6 pages, May 1, 1996.
"Shared Services (Data/Voice Network)", Communications News, vol. 25, No. 11, pp. 46-47, Nov. 1, 1988.
3Com, "48 Volt DC Power Supply Connection Guide for the SuperStack II Switch 3900", pp. 1-12, Mar. 1, 2000.
Bramblett, Steve, "Connect Terminals to your CPU Over PBX Telephone Lines", EDN, vol. 31, No. 5, pp. 239-243, 245, 246, 248, Mar. 6, 1986.
Cisco Systems, "Quick Start Guide: Cisco 2610 Router Cabling and Setup", 18 pages, Jan. 1, 1998.
"TeleConcepts . . . Introduces the Just Plug It in Intercom System". TeleConcepts Brochure, Newington, CT (published before Jul. 3, 1995), 4 pages, Jul. 3, 1995.
Eldering, Charles A., "Customer Premises Equipment for Residential Broadband Networks", IEEE Communications Magazine, p. 114-121, Jun. 1, 1997.
"Draft IS-60.04 Node Communications Protocol; Part 6: Application Layer Specification", 129 pages, Apr. 18, 1996.
Gibson, Richard et al, "Fiber Distributed Data Interface (FDDI)—Token Ring Physical Layer Protocol (PHY)"; American National Standard for Information Systems, 34 pages, Jan. 1, 1988.
"LonWorks Router User's Guide Revision 3", Echelon Corporation, 68 pages, Jan. 1, 1995.
Webb, Joseph A., "A New Concept in Data-Above-Voice (DAV)", PTC '86: Evolutions of the Digital Pacific Telecommunications—Asia, Americas, Pacific: PTC '86 Proceedings, Honolulu, Hawaii, pp. 260-265, Jan. 12, 1986.
"VISPLAN-10 Infrared Wireless LAN System"; JVC, 10 pages, May 1, 1996.
"PL DSK 2.1 Power Line Smart Transceiver Development Support Kit User's Guide", Echelon Corporation, 2005-2006, 18 pages, Jan. 1, 2005.
"Motorola CableComm CyberSURFR Cable Modem Specifications", 4 pages, Apr. 1, 1998.
Fanshawe, David G.J., "Architectures for Home Systems", Conference, IEEE Colloquium on Home Systems—Information, Entertainment and Control, London, United Kingdom, 4 pages, Oct. 1, 1990.
"DSLPipe Reference Guide"; by Ascend Communications, 162 pages, Jun. 2, 1997.
NetSpeed, "Speed Runner 202 Customer Premise ATM ADSL Router", 1-4, Jan. 1, 1997.
Fuchs, Harry et al, "Providing Full Duplex Transmission Over Two-Wire Subscriber Loops", Telephony, vol. 208, No. 11, pp. 76,77,78 and 84, Mar. 18, 1985.
*Serconet, Ltd., v. Netgear, Inc.* Case No. CV-06-04646 PJH, Claim Comparison Chart for USP 7,035,280, 1-124, Jan. 29, 2007.
Yamazaki, T. et al, "Home Appliance Technologies", NEC Research and Development, No. 96, pp. 292-299, Mar. 1, 1990.
The Mac Reborn; Macworld September 1996, 104-115, Sep. 1, 1996.
Keller et al, "Performance Bottlenecks in Digital Movie Systems", Proceedings of the 4th International Workshop on Network and Operating System Support for Digital Audio and Video., pp. 161-172, Jan. 1, 1993.
Tatum, Roger A., "Project Victoria—the 7-in-1 Solution", Telephone Engineer and Management, vol. 90, No. 1, pp. 47-50, Jan. 1, 1986.
"Using the LonWorks PLT-22 Power Line Transceiver in European Utility Application", Version 1, Echelon Coporation 1996-1999, 118 pages, Jan. 1, 1996.

Cisco Systems, "Cisco Catalyst 5000 Product Announcement : Industry's First Modular, Multilayer-Capable Switching System for the Wiring Closer", 22 pages, Jan. 1, 1996.
Willet, M., "Token-Ring Local Area Networks—An Introduction", IEEE Network Magazine, vol. 1, No. 1., pp. 8 and 9, Jan. 1, 1987.
"Video Transmission System—Send Video Over Ordinary Wire—No Coax Required", Javelin Brochure (published before Jul. 3, 1995), 2 pages, Jul. 3, 1995.
Funkschau, "CEBus: US Households Are Being Networked", Funkschau, No. 9, 4 pages, Apr. 21, 1989.
3Com, "3ComImpact IQ External ISDN Modem User Guide", 158 pages, Jul. 1, 1997.
Mandeville, Robert et al, "Canned Heat: High Stress Tests Turn Up High-Speed Switches That Burn Through Backbone Bottlenecks", Data Communications of the Web, 10 pages, Feb. 1, 1996.
"Universal Serial Bus Specification"—Rev.1.0 , Sec. 7.2.1-7.2.1.5 pp. 131-135, Jan. 15, 1996.
"LonWorks LPI-10 Link Power Interface Module User's Guide", Echelon Corporation, 37 pages, Jan. 1, 1995.
Chow, Peter S. et al, "A Multi-drop in house ADSL Distribution Network", International Conference on Communication., pp. 456-460, Jan. 1, 1994.
"Integrated Services Digital Network (ISDN)", International Telecommunications Union, vol. III, Fascicle III.8, pp. 175-176 and 204-209, Jan. 1, 1988.

\* cited by examiner

*Primary Examiner* — Stella Woo
(74) *Attorney, Agent, or Firm* — Winstead PC

(57) ABSTRACT

An outlet for coupling at least one data unit to digital data carried over wiring that simultaneously carry a packet-based serial digital data signal and a power signal over the same conductors. The outlet includes: a wiring connector for connecting to the wiring; a transceiver coupled to the wiring connector for transmitting and receiving packet-based serial digital data over the wiring; a LAN connector coupled to the transceiver for bi-directional packet-based data communication with at least one data unit; a bridge or a router coupled between the transceiver and the LAN connector for passing data bi-directionally between the at least one data unit and the wiring; and a single enclosure housing the above-mentioned components. The enclosure is mountable into a standard wall outlet receptacle or wall outlet opening, and the transceiver and the bridge or router are coupled to the wiring connector to be powered from the power signal.

8 Claims, 11 Drawing Sheets

TELEPHONE OUTLET FOR IMPLEMENTING A LOCAL AREA NETWORK OVER TELEPHONE LINES AND A LOCAL AREA NETWORK USING SUCH OUTLETS

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 Khz (typically the energy is concentrated around 40 Khz). The term "telephone line" herein denotes electrically-conducting lines which are intended primarily for the carrying and distribution of analog telephony, and includes, but is not limited to, such lines which may be pre-existing within a building and which may currently provide analog telephony service. The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of telephone outlets 11a, 11b, 11c, and 11d. Each telephone outlet has a connector (often referred to as a "jack"), denoted in FIG. 1 as 12a, 12b, 12c, and 12d, respectively. Each telephone outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors.

There is a requirement for using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al. (hereinafter referred to as "Reichert"). Also is widely used are xDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers. DCE units 23a, 23b, and 23c are respectively connected to high pass filters (HPF) 22a, 22b, and 22c. The HPF's allow the DCE units access to the high-frequency band carried by telephone line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, a second embodiment is suggested (shown in FIG. 2), wherein low pass filters (LPF's) 21a, 21b, and 21c are added to isolate telephones 13a, 13b, and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d, and 5e are electrically the same paired conductors.

However, the Dichter network suffers from degraded data communication performance, because of the following drawbacks:

1. Induced noise in the band used by the data communication network is distributed throughout the network. The telephone line within a building serves as a long antenna, receiving electromagnetic noise produced from outside the building or by local equipment such as air-conditioning systems, appliances, and so forth. Electrical noise in the frequency band used by the data communication network can be induced in the extremities of telephone line 5 (line 5c or 5a in FIG. 2) and propagated via telephone line 5 throughout the whole system. This is liable to cause errors in the data transportation.

2. The wiring media consists of a single long wire (telephone line 5). In order to ensure a proper impedance match to this transmission-line, it is necessary to install terminators at each end of telephone line 5. One of the advantages of using the telephone infrastructure for a data network, however, is to avoid replacing the internal wiring. Thus, either such terminators must be installed at additional cost, or suffer the performance problems associated with an impedance mismatch.

3. In the case where LPF 21 is not fitted to the telephones 13, each connected telephone appears as a non-terminated stub, and this is liable to cause undesirable signal reflections.

4. In one embodiment, LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media. Such topology suffers from a number of drawbacks, as described in U.S. Pat. No. 5,841,360 to the present inventor, which is incorporated by reference for all purposes as if fully set forth herein. Dichter also discloses drawbacks of the bus topology, including the need for bus mastering and logic to contend with the data packet collision problem. Topologies that are preferable to the bus topology include the Token-Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

Although the above-mentioned prior-art networks utilize existing in-home telephone lines and feature easy installation and use without any additions or modifications to the telephone line infrastructure (wires, outlets, etc.), they require dedicated, non-standard, and complex DCE's, modems, and filters, and cannot employ standard interfaces. For example, Ethernet (such as IEEE802.3) and other standards are commonly used for personal computers communication in Local Area network (LAN) environments. With prior-art techniques, in order to support communication between computers, each computer must be equipped with an additional modem for communicating over the telephone line. Whether these additional modems are integrated into the computer (e.g. as plug-in or built-in hardware) or are furnished as external units between the computer and the telephone line, additional equipment is required. The prior-art networks therefore incur additional cost, space, installation labor, electricity, and complexity. It would therefore be desirable to provide a network which contains integral therewith the necessary standard interfaces, thereby obviating the need to provide such interfaces in the DTE's.

There is thus a widely-recognized need for, and it would be highly advantageous to have, a means for implementing a data communication network using existing telephone lines of arbitrary topology, which continues to support analog telephony, while also allowing for improved communication characteristics by supporting a point-to-point topology network.

Furthermore, there is also a need for, and it would be highly advantageous to have, a means and method for implementing such an in-house data communication network using existing telephone lines, wherein the DTE's (e.g. computers, appliances) can be interconnected solely by using standard interfaces, without the need for modifications or adding external units to the DTE's.

SUMMARY OF THE INVENTION

It is therefore an object of the present invention to provide a method and apparatus for upgrading an existing telephone line wiring system within a residence or other building, to provide both analog telephony service and a local area data network featuring a serial "daisy chained" or other arbitrary topology.

To this end, the regular telephone outlets are first replaced with network outlets to allow splitting of the telephone line having two or more conductors into segments such that each segment connecting two network outlets is fully separated from all other segments. Each segment has two ends, to which various devices, other segments, and so forth, may be connected via the network outlets, and are such that the segments can concurrently transport telephony and data communications signals. A network outlet contains a low pass filter, which is connected in series to each end of the segment, thereby forming a low-frequency between the external ports of the low pass filters, utilizing the low-frequency band. Similarly, a network outlet contains a high pass filter, which is connected in series to each end of the segment, thereby forming a high-frequency path between the external ports of the high pass filters, utilizing the high-frequency band The bandwidth carried by the segments is thereby split into non-overlapping frequency bands, and the distinct paths can be interconnected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any network outlet, whereas the segments may remain individually isolated in the high-frequency (data) band, so that in this data band the communication media, if desired, can appear to be point-to-point (such as a serialized "daisy chain") from one network outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

Each network outlet has a standard data interface connector which is coupled to data interface circuitry for establishing a data connection between one or more segments and a data device, such as Data Terminal Equipment, connected to the data interface connector.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

Data Terminal Equipment as well as telephone devices can be readily connected to the network outlets using standard interfaces and connectors, thereby allowing a data communications network as well as a telephone system to be easily configured, such that both the data communications network and the telephone system can operate simultaneously without interference between one another.

A network according to the present invention may be used advantageously when connected to external systems and networks, such as xDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to a first aspect of the present invention there is provided a local area network within a building, for transporting data among a plurality of data devices, the local area network including:

(a) at least two network outlets, each of said network outlets having:
  i) at least one data interface connector and data interface circuitry coupled to said data interface connector and operative to establishing a data connection between a data device and said data interface connector;
  ii) at least one standard telephone connector operative to supporting standard telephony service by connecting a standard telephone device;
  iii) a splitter operative to separating telephony and data communications signals; and
  iv) a coupler operative to combining telephony and data communications signals;
(b) at least one telephone line segment within the walls of the building, each said telephone line segment connecting at least two of said network outlets and having at least two conductors, said telephone line segment operative to concurrently transporting telephony and data communication signals; and
(c) at least one modem housed within each of said network outlets for establishing a data connection over said at least one telephone line segment, said at least one modem operative to transmitting and receiving signals over said telephone line segment, and coupled thereto.

According to a second aspect of the invention there is provided a network outlet for configuring a local area network for the transport of data across telephone lines and for enabling telephony across the telephone lines simultaneous with the transport of data, the network outlet comprising:

(a) at least one data interface connector and data interface circuitry coupled to said at least one data interface connector and being jointly operative to establishing a data connection between a data device and said at least one data interface connector;

(b) at least one telephone connector operative to supporting standard telephony service by connecting a standard telephone device thereto;

(c) a splitter adapted to be coupled to the telephone lines and being operative to separating telephony and data communications signals transported over the telephone lines; and (d) a coupler having an output adapted to be coupled to the telephone lines and being operative to combining telephony and data communications signals to be transported over the telephone lines.

According to a third aspect, the invention provides a method for upgrading an existing telephone system to operate both for telephony and as a local area network for transporting data among a plurality of data devices, the telephone system having a plurality of telephone outlets connected to at least one telephone line within the walls of a building, the method comprising the steps of:

(a) mechanically removing at least two of the telephone outlets from the walls of the building;

(b) electrically disconnecting said at least two telephone outlets from the at least one telephone line;

(c) providing at least two network outlets, each of said network outlets having a data interface connector and data interface circuitry coupled to said data interface connector and operative to establishing a data connection between a data device and said data interface connector;

(d) electrically connecting said network outlets to the at least one telephone line; and (e) mechanically securing said network outlets to the wall.

BRIEF DESCRIPTION OF THE DRAWINGS

The invention is herein described, by way of non-limiting example only, with reference to the accompanying drawings, wherein.

DETAILED DESCRIPTION OF PREFERRED EMBODIMENTS

Figure 1:
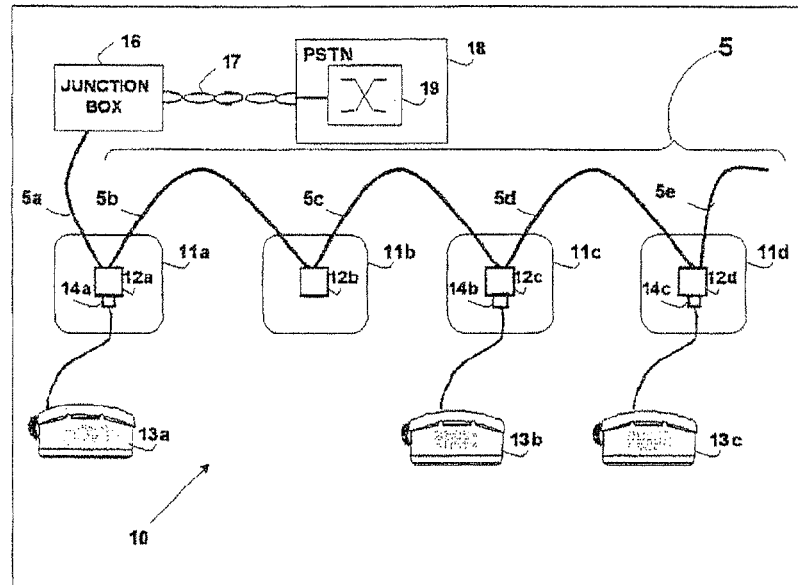
FIG. 1 shows a common prior art telephone line wiring configuration for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
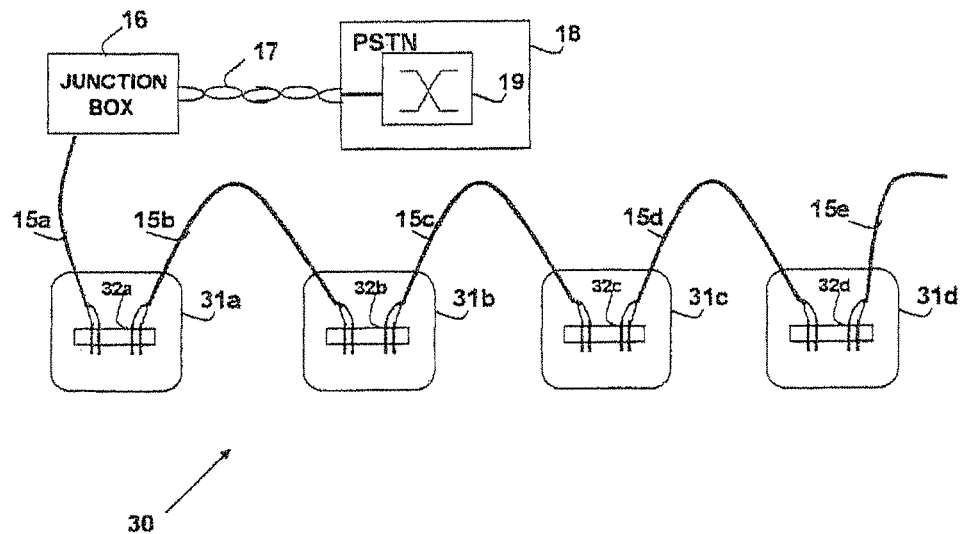
FIG. 3 shows modifications to telephone line wiring according to the present invention for a local area network.

The basic concept of the invention is shown in FIG. 3. A network 30 is based on network outlets 31a, 31b, 31c, and 31d. The installation of a network supporting both telephony and data communications relates to the installation of such network outlets. Similarly, the upgrade of an existing telephone system relates to replacing the existing telephone outlets with network outlets. In the descriptions which follow, an upgrade of an existing telephone system is assumed, but the procedures can also be applied in a like manner for an initial installation that supports both telephony and data communications.

A network outlet is physically similar in size, shape, and overall appearance to a standard telephone outlet, so that a network outlet can be substituted for a standard telephone outlet in the building wall. No changes are required in the overall telephone line layout or configuration. The wiring is changed by separating the wires at each network outlet into distinct segments of electrically-conducting media. Thus, each segment connecting two network outlets can be individually accessed from either end. In the prior art Dichter network, the telephone wiring is not changed, and is continuously conductive from junction box 16 throughout the system. According to the present invention, the telephone line is broken into electrically distinct isolated segments 15a, 15b, 15c, 15d, and 15e, each of which connects two network outlets. In order to fully access the media, each of connectors 32a, 32b, 32c, and 32d must support four connections, two in each segment. This modification to the telephone line can be carried out by replacing each of the telephone outlets 31a, 31b, 31c, and 31d. As will be explained later, the substitutions need be performed only at those places where it is desirable to be able to connect to data network devices. A minimum of two telephone outlets must be replaced with network outlets, enabling data communication between those network outlets only.

Figure 4:
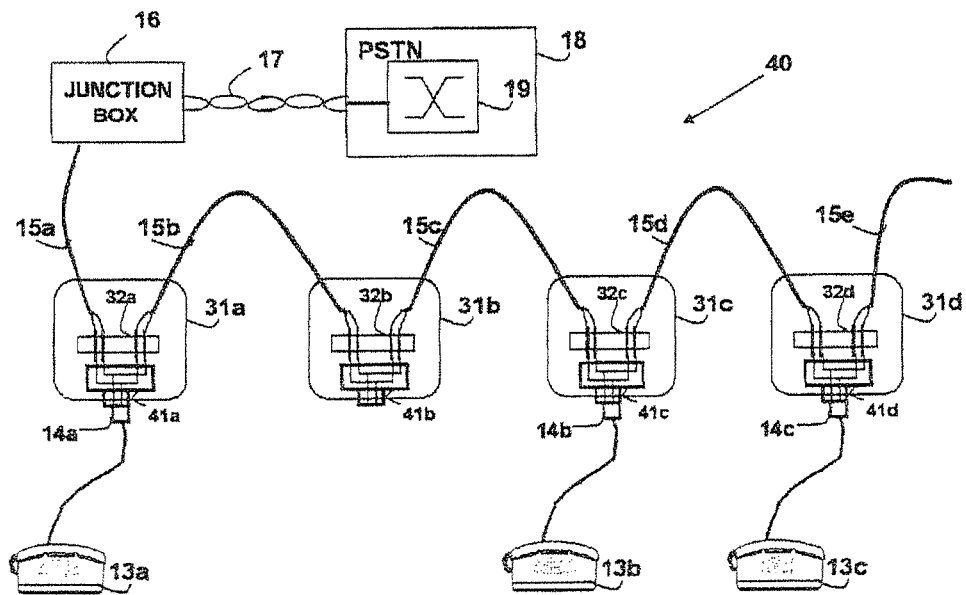
FIG. 4 shows modifications to telephone line wiring according to the present invention, to support regular telephone service operation.

FIG. 4 shows how a network 40 of the present invention continues to support regular telephone service, by the installation of jumpers 41a, 41b, 41c, and 41d in network outlets 31a, 31b, 31c and 31d respectively. At each network outlet where they are installed, the jumpers connect both segment ends and allow telephone connection to the combined segment. Installation of a jumper effects a re-connection of the split telephone line at the point of installation. Installation of jumpers at all network outlets would reconstruct the prior art telephone line configuration as shown in FIG. 1. Such jumpers can be add-ons to the network outlets, integrated within the network outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all network outlets which are not required for connection to the data communication network. Those network outlets which are required to support data communication connections, however, will not use jumper 41 but rather a splitter 50, shown in FIG. 5. Such a splitter connects to both segments in each network outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53, which may be a standard telephone connector. Hence, from the telephone signal point of view, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a data interface connector 56 and a data interface connector 57, respectively, which may be standard data connectors. The term "splitter" herein denotes any device for selectively coupling or isolating the distinct segments that is specific to the frequency band of the coupled or isolated signals. The term "coupler" is used herein in reference to any device used for combining separate signals into a combined signal encompassing the originally-separate signals, including a device such as a splitter used for signal coupling.

Therefore, when installed in a network outlet, splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the network outlets. With the use of splitters, the telephone system and the data communication network are actually decoupled, with each supporting a different topology.

Figure 6:
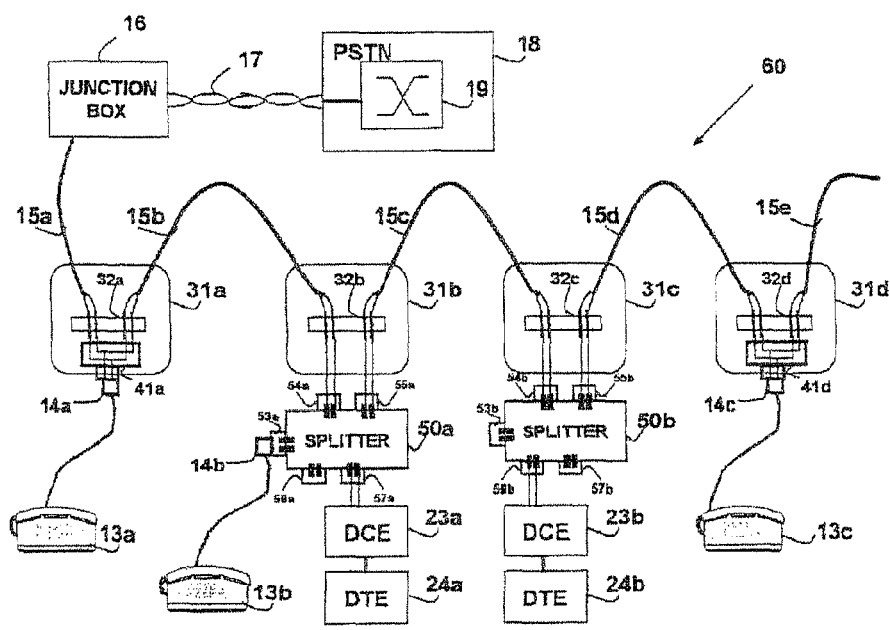
FIG. 6 shows a local area network based on telephone lines according to the present invention, wherein the network supports two devices at adjacent network outlets.

FIG. 6 shows a first embodiment of a data communication network 60 between two DTE units 24a and 24b, connected to adjacent network outlets 31b and 31c, which are connected together via a single segment 15c. Splitters 50a and 50b are connected to network outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to network outlet 31c by connecting the telephone to connector 53b on splitter 50b. It should be clear that connecting a telephone to a network outlet, either via jumper 41 or via splitter 50 does not affect the data communication network.

Figure 5:
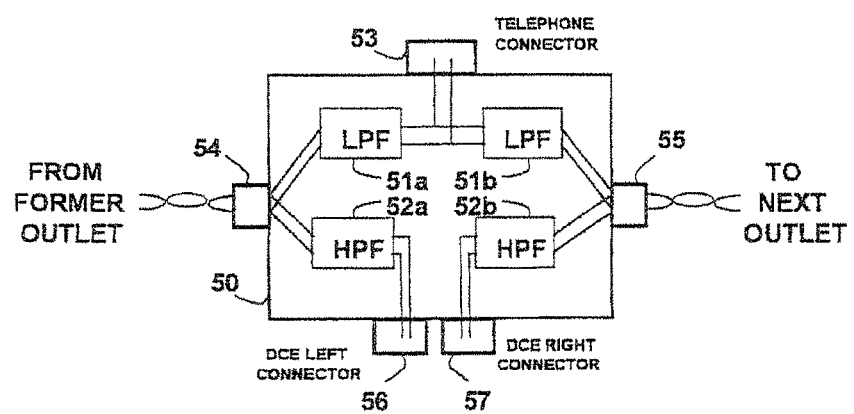
FIG. 5 shows a splitter according to the present invention.

Network 60 (FIG. 6) supports data communication by providing a communication path between port 57a of splitter 50a and port 56b of splitter 50b. Between those ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15c. As an example, the implementation of data transmission over a telephone line point-to-point system described in Reichert can also be used in network 60. Reichert implements both LPF and HPF by means of a transformer with a capacitor connected in the center-tap, as is well-known in the art. Similarly, splitter 50 can be easily implemented by two such circuits, one for each side.

It should also be apparent that HPF 52a in splitter 50a and IPF 52b in splitter 50b can be omitted, because neither port 56a in splitter 50a nor port 57b in splitter 50b is connected.

Network 60 provides clear advantages over the networks described in the prior art. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into network outlet 31. In such a case, network outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to network outlet 31. In another embodiment, the splitter is included as part of DCE 23. However, in order for network 60 to operate properly, either jumper 41 or splitter 50 must be employed in network outlet 31 as modified in order to split connector 32 according to the present invention, allowing the retaining of regular telephone service.

Figure 7:
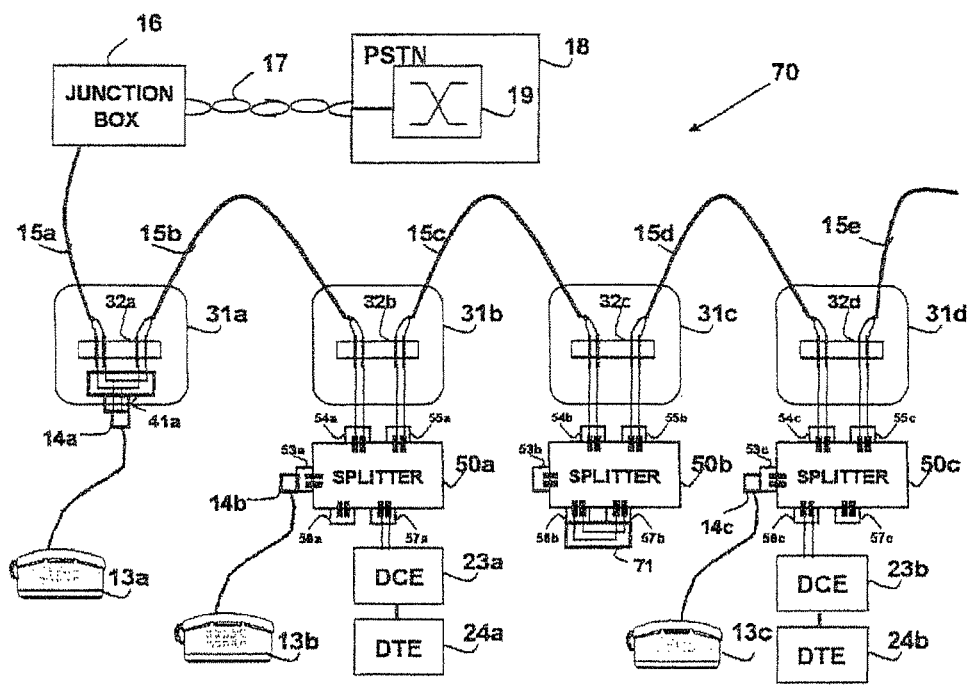
FIG. 7 shows a first embodiment of a local area network based on telephone lines according to the present invention, wherein the network supports two devices at non-adjacent network outlets.

FIG. 7 also shows data communication between two DTE units 24a and 24b in a network 70. However, in the case of network 70, DTE units 24a and 24b are located at network outlets 31b and 31d, which are not directly connected, but have an additional network outlet 31c interposed between. Network outlet 31c is connected to network outlet 31b via a segment 15c, and to network outlet 31d via a segment 15d.

In one embodiment of network 70, a jumper (not shown, but similar to jumper 41 in FIG. 4) is connected to a connector 32c in network outlet 31c. The previous discussion regarding the splitting of the signal spectrum also applies here, and allows for data transport between DTE units 24a and 24b via the high-frequency portion of the spectrum across segments 15c and 15d. When only jumper 41 is connected at network outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at network outlet 31c. Such degradation can be the result of noise produced by the telephone in the high-frequency data communication band, as well as the result the addition of a tap caused by the telephone connection, which usually has a non-matched termination. Those problems can be overcome by installing a low pass filter in the telephone.

In a preferred embodiment of network 70, a splitter 50b is installed in network outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused network outlet between the network outlets to which the DTE units are connected, it should be clear that the any number of unused network outlets between the network outlets to which the DTE units are connected can be handled in the same manner.

Figure 8:
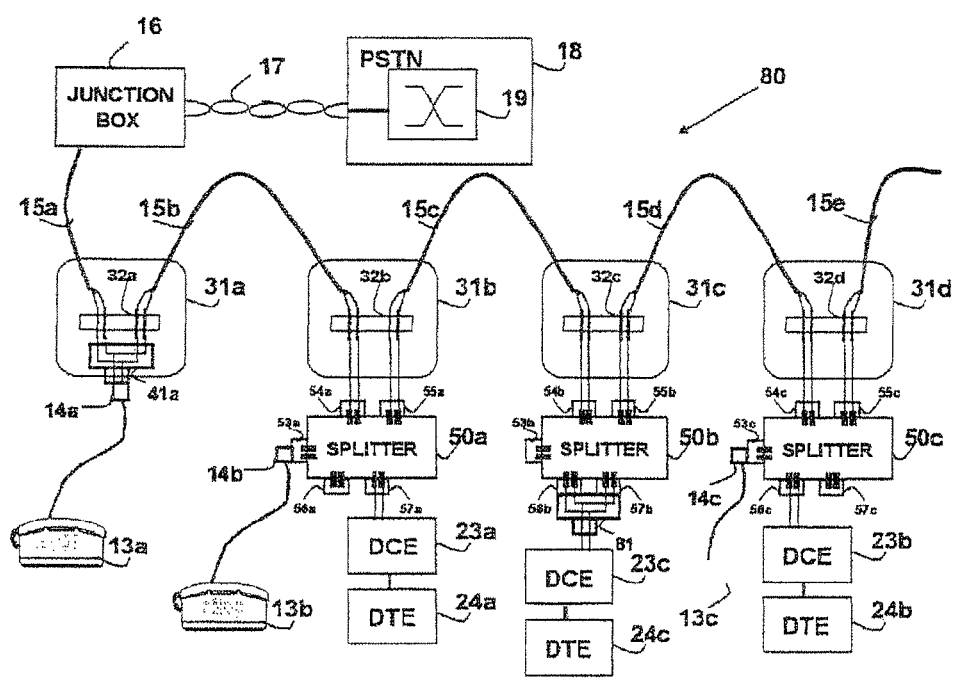
FIG. 8 shows a second embodiment of a local area network based on telephone lines according to the present invention, wherein the network supports three devices at adjacent network outlets.

For the purpose of the foregoing discussions, only two communicating DTE units have been described. However, the present invention can be easily applied to any number of DTE units. FIG. 8 illustrates a network 80 supporting three DTE 20 units 24a, 24b, and 24c, connected thereto via DCE units 23a, 23b, and 23c, respectively. The structure of network 80 is the same as that of network 70 (FIG. 7), with the exception of the substitution of jumper 71 with a jumper 81. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b, and 24c. Obviously, this configuration can be adapted to any number of network outlets and DTE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention. A network according to the present invention can therefore be an Ethernet network.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar network outlets in FIG. 8, illustrating network 80. In network 80, network outlets 31b, 31c, and 31d are similar and are all used as part of the data communication network. Therefore for uniformity, these network outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23b, respectively. In a preferred embodiment of the present invention, all telephone outlets in the building will be replaced by network outlets which include both splitter 50 and jumper 81 functionalities. Each such network outlet will provide two connectors: one connector coupled to port 53 for a telephone connection, and the other connector coupled to jumper 81 for a DCE connection.

The terms "standard connector", "standard telephone connector", and "standard data connector" are used herein to denote any connectors which are industry-standard or de facto standard connectors. Likewise, the term "standard telephone device" is used herein to denote any telephone device which is a commercial standard or de facto standard telephone device, and the term "standard telephony service" is used herein to denote any commercially-standard or de facto standard telephony.

In yet another embodiment, DCE 23 and splitter 50 are integrated into the housing of network outlet 31, thereby offering a direct DTE connection. In a preferred embodiment, a standard DTE interface is employed.

Figure 9:
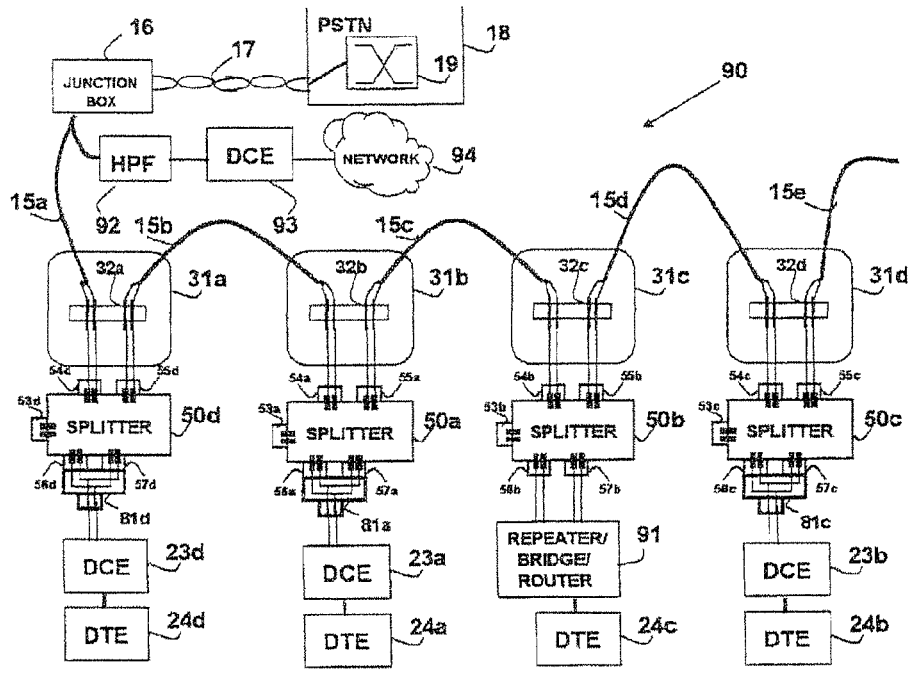
FIG. 9 shows third embodiment of a local area network based on telephone lines according to the present invention, wherein the network is a bus type network.

In most 'bus' type networks, it is occasionally required to split the network into sections, and connect the sections via repeaters (to compensate for long cabling), via bridges (to decouple each section from the others), or via routers. This may also be according to the present invention, as illustrated in FIG. 9 for a network 90, which employs a repeater/bridge/router unit 91. Unit 91 can perform repeating, bridging, routing, or any other function associated with a split between two or more networks. As illustrated, a splitter 50b is coupled to a network outlet 31c, in a manner similar to the other network outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

As illustrated above, a network outlet can also function as a repeater by the inclusion of the appropriate data interface circuitry. Circuitry implementing modems, and splitters, such as the high pass filters as well as the low pass filters, can function as data interface circuitry.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c, and 24b within the building to communicate with the ADSL network. The capability of communicating with external DTE units or networks is equally applicable to all other embodiments of the present invention, but for clarity is omitted from the other drawings.

Figure 10:
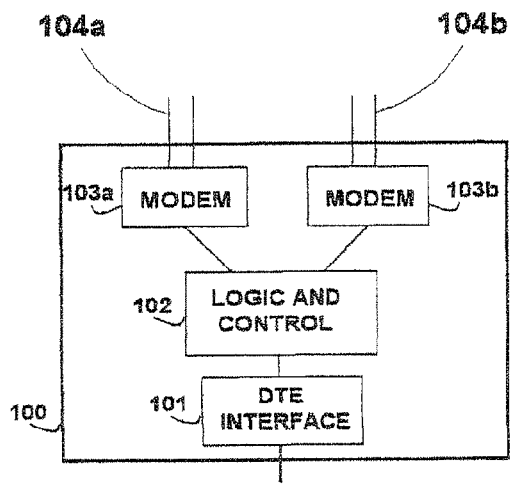
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11A:
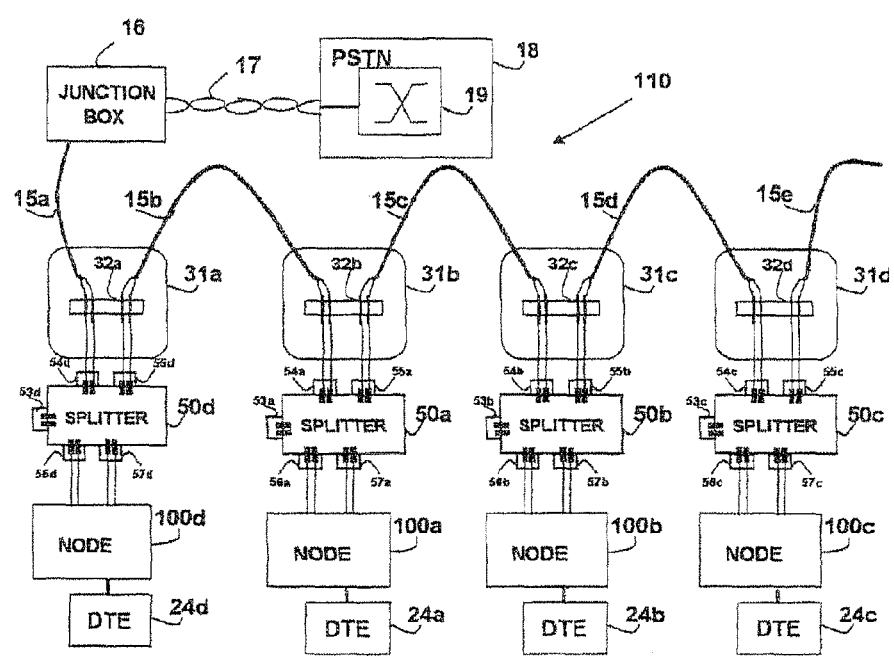
FIG. 11A shows a fourth embodiment of a local area network based on telephone lines according to the present invention.

FIG. 11 describes a network 110 containing nodes 100d, 100a, 100b, and 100c coupled directly to splitters 50d, 50a, 50b and 50c, which in turn are coupled to network outlets 31a, 31b, 31c, and 31d respectively. Each node 100 has access to the corresponding splitter 50 via two pairs of contacts, one of which is to connector 56 and the other of which is to connector 57. In his way, for example, node 100a has independent access to both segment 15b and segment 15c. This arrangement allows building a network connecting DTE units 24d, 24a, 24b, and 24c via nodes 100d, 100a, 100b, and 100c, respectively.

For clarity, telephones are omitted from FIGS. 9 and 11, but it should be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Figure 2:
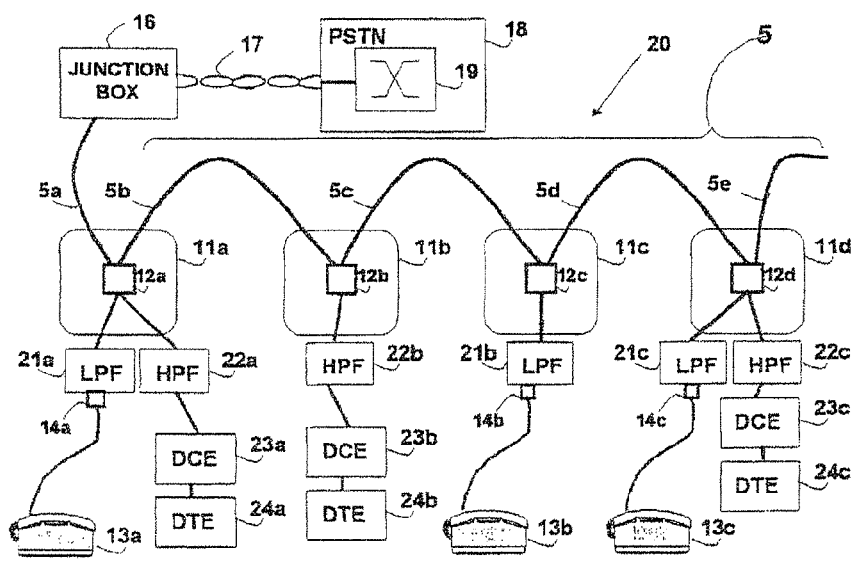
FIG. 2 shows a prior art local area network based on telephone line wiring for a residence or other building.

The present invention has been so far described in embodiments in which the telephone wiring segments are split, and which therefore modify the original galvanic continuity of the telephone wiring, as shown in FIG. 3. Such embodiments require the removal of outlets in order to access the internal wiring. However, the present invention can be applied equally-well to prior-art schemes such as the Dichter network (as illustrated in FIG. 2), wherein the continuity of the telephone wiring is not disturbed, and there the wiring is not split into electrically distinct segments.

Figure 11B:
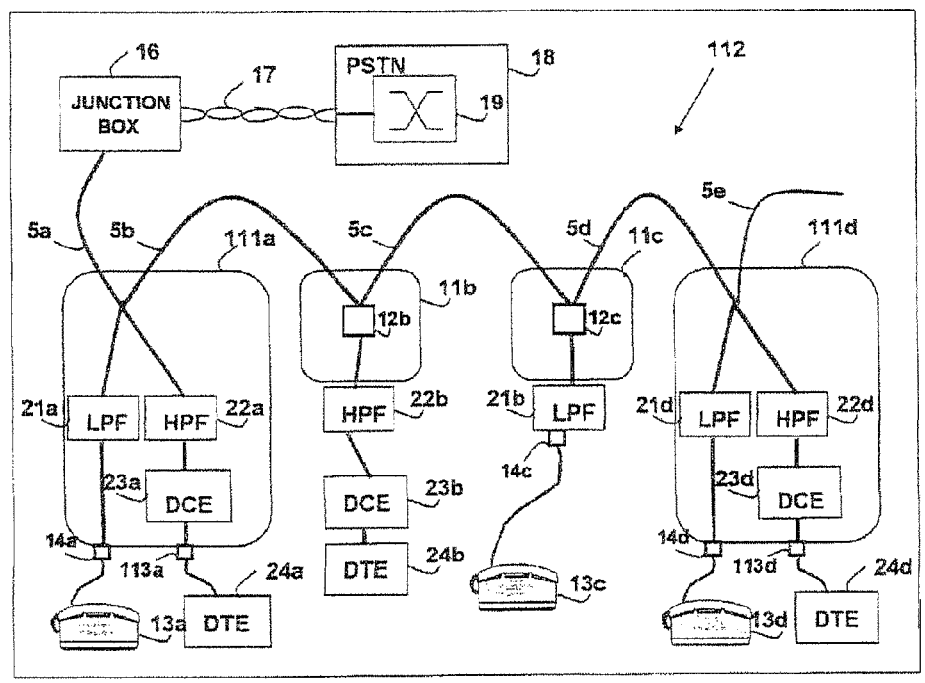
FIG. 11B shows an embodiment of the present invention for use with telephone wiring that is not separated into distinct segments.

Thus, an embodiment of a network utilizing the network outlets of the present invention is shown in FIG. 11B as a network 112. Generally, the Dichter network of FIG. 2 is employed. However, network outlets 11a and 11b (corresponding to network outlets 11a and 11d of FIG. 2) are modified so that all components are housed therein. In such a case, the splitter/combiner is a single low pass filter 21 and a single high pass filter 22. High pass filter 22 is coupled to single telephone-line modem/DCE 23. A single high pass filter, a single low pass filter, and a single DCE are used, since the connection to the telephone line involves a single, point of connection. However, since point-to-point topology is not used in this case, modem 23 is expected to be more complex than in the other described embodiments. Each outlet 111 has standard telephone connector 14 for connecting the telephone set, and standard data connector 113 for the DTE connection. For example, a 10BaseT interface employing an RJ-45 connector can be used for the DTE connection.

Furthermore, although the present invention has so far been described with a single DTE connected to a single network outlet, multiple DTE units can be connected to a network outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of network outlets which have only two connections and therefore can connect only to two other network outlets (i.e., in a serial, or "daisy chain" configuration), the concept can also be extended to three or more connections. In such a case, each additional connecting telephone line must be broken at the network outlet, with connections made to the conductors thereof, in the same manner as has been described and illustrated for two segments. A splitter for such a multi-segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, a network outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within network outlet 31. Moreover, the network outlet may contain standard connectors for devices, such as DTE units. In one embodiment, only passive components are included within the network outlet. For example, splitter 50 can have two transformers and two capacitors (or an alternative implementation consisting of passive components). In another embodiment, the network outlet may contain active, power-consuming components. Three options can be used for providing power to such circuits:

1. Local powering: In this option, supply power is fed locally to each power-consuming network outlet. Such network outlets must be able to support connection for input power.

2. Telephone power: In both POTS and ISDN telephone networks, power is carried in the lines with the telephone signals. This power can also be used for powering the network outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.

3. Dedicated power carried in the media: In this option, power for the data communication related components is carried in the communication media.

For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

Figure 12:
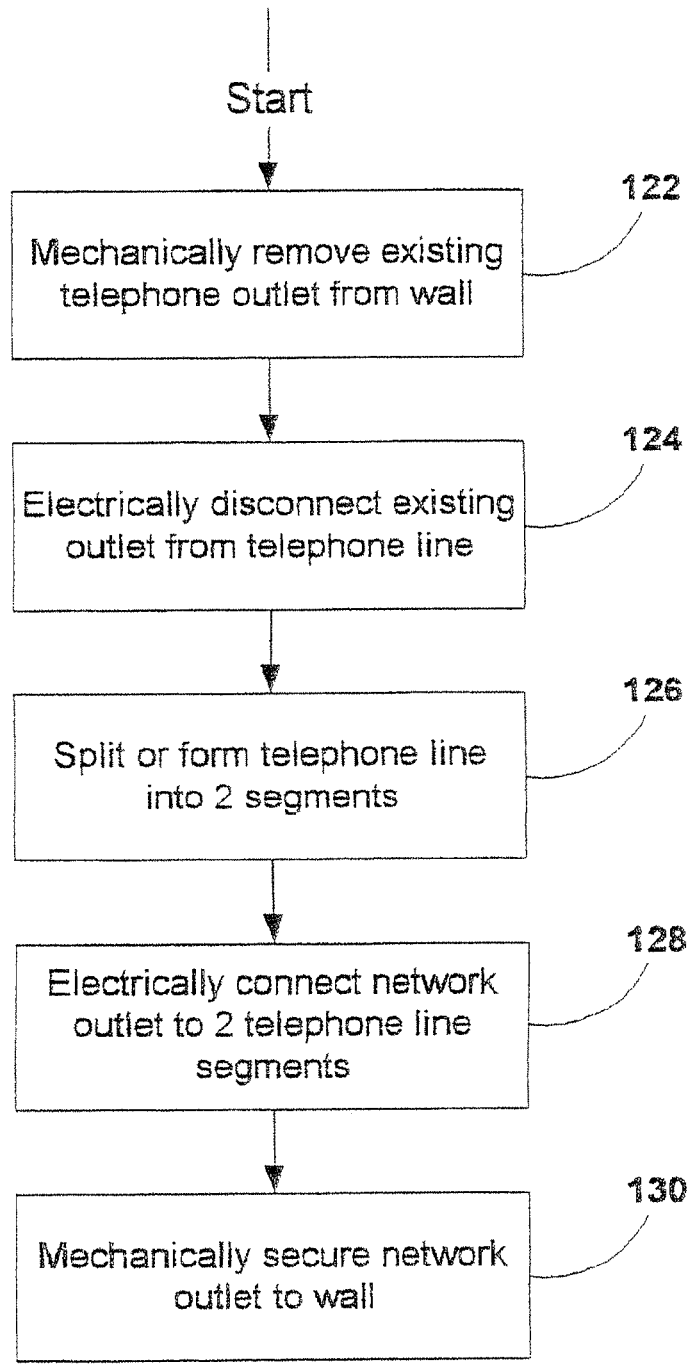
FIG. 12 is a flowchart illustrating the sequence of steps in an installation method according to the present invention for upgrading an existing telephone system.

Upgrading existing telephone lines within a building can be done by the method illustrated in the flowchart of FIG. 12. At least two telephone outlets must be replaced by network outlets in order to support data communications. For each outlet to be replaced, the steps of FIG. 12 are performed as shown. In a step 122, the existing telephone outlet is mechanically removed from the wall. Next, in a step 124, the existing telephone outlet is electrically disconnected from the telephone line. At this point in a step 126, the existing telephone line is split or formed into two isolated segments. Depending on the existing configuration of the telephone line, this could be done by cutting the telephone line into two segments, by separating two telephone lines which had previously been joined at the existing telephone outlet, or by utilizing an unused wire pair of the existing telephone line as a second segment. Then, in a step 128, the two segments are electrically connected to a new network outlet, in a manner previously illustrated in FIG. 5, where one of the segments is connected to connector 54 and the other segment is connected to connector 55. Note that separating the telephone line into two segments is not necessary in all cases. If only two network outlets are desired, the telephone line does not have to be split, because a single segment suffices to connect the two network outlets. If more than two network outlets are desired, however, the telephone line must be split or formed into more than one segment. Finally, in a step 130 (FIG. 12), the network outlet is mechanically replaced and secured into the wall in place of the original telephone outlet.

While the above description describes the non-limiting case where two wire segments are connected to the outlet (such as outlets 11a, 11b, 11c and 11d), in general it is also possible to connect a single segment or more than two segments to the outlet.

Figure 13:
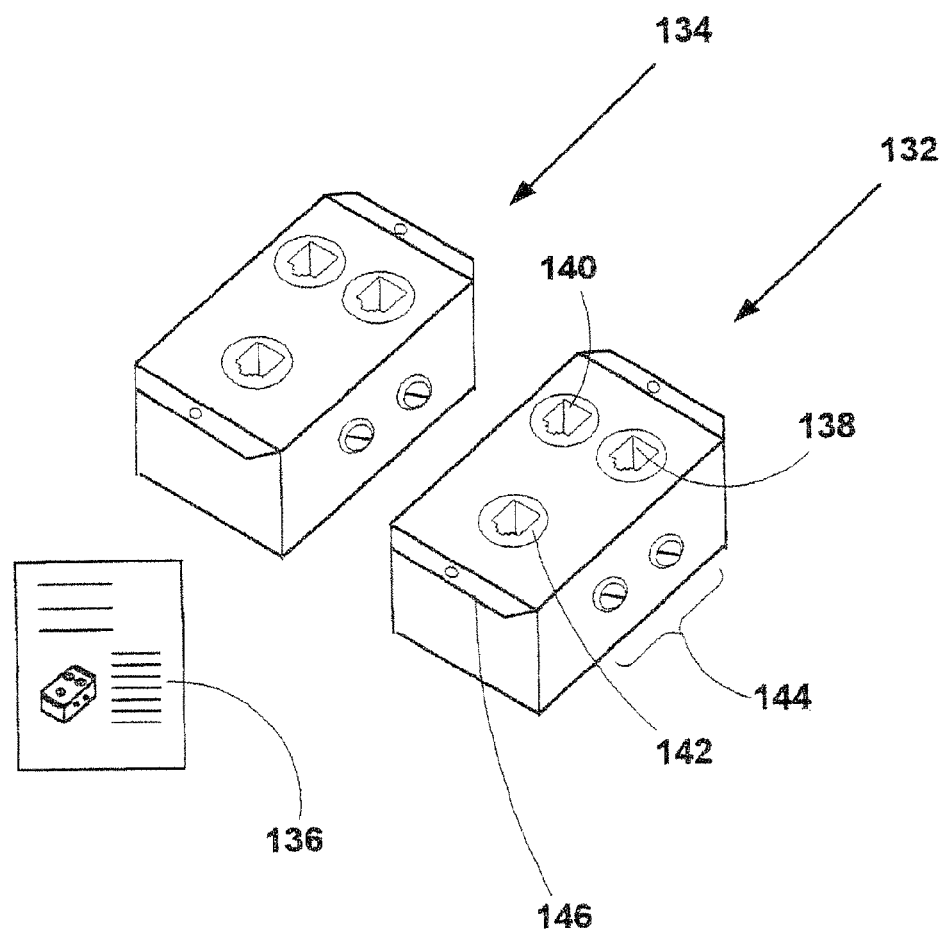
FIG. 13 illustrates the components of a basic kit according to the present invention for upgrading a telephone system to a local area data network.

In order to facilitate the upgrade of existing telephone systems for simultaneous telephony and data communications, the network outlets as described previously can be packaged in kit form with instructions for performing the method described above. As illustrated in FIG. 13, a basic kit contains two network outlets 132 and 134 with instructions 136, while supplementary kits need contain only a single network outlet 132. A network outlet 132 houses two standard data connectors 138 and 140, and a standard telephone connector 142, corresponding to connectors 57, 56, and 53, respectively, of FIG. 5. In addition, network outlet 132 has connectors 144 for electrically connecting to the segment of the telephone line. Connectors 144 correspond to connector 55 of FIG. 5 (connector 54 of FIG. 5 is omitted from FIG. 13 for clarity). Furthermore, network outlet 132 has flanges, such as a flange 146, for mechanically securing to a standard in-wall junction box. A homeowner could purchase a basic kit according to the present invention to upgrade an existing telephone system to a local area network, and then purchase whatever supplementary kits would be needed to expand the local area network to any degree desired.

While the invention has been described with respect to a limited number of embodiments, it will be appreciated that many variations, modifications and other applications of the invention may be made.

What is claimed is:

1. An outlet for coupling at least one data device to digital data carried over wiring that simultaneously carry a bi-directional packet-based serial digital data signal and a power signal over same conductors, and the outlet comprising:
   a wiring connector for connecting to the wiring;
   a transceiver coupled to the wiring connector and operative for transmitting and receiving bi-directional packet-based serial digital data over the wiring;
   a LAN connector coupled to the transceiver for bi-directional packet-based serial digital data communication with one or more data devices;
   a bridge or a router coupled between the transceiver and the LAN connector for passing data bi-directionally between the one or more data devices and the wiring; and
   a single enclosure housing the transceiver, the wiring connector, the LAN connector, and the bridge or router,
   wherein the enclosure is dimensioned to be mountable into a standard wall outlet receptacle or wall outlet opening, and wherein the transceiver and the bridge or router are coupled to the wiring connector to be powered from the power signal.

2. The outlet of claim 1, wherein said outlet further comprises a standard telephone connector housed in said single enclosure.

3. The outlet of claim 1, wherein said LAN connector comprises two standard data connectors housed in said single enclosure, each said standard data connector being connectable to a respective data device.

4. The outlet of claim 1, wherein the wiring includes at least two segments that are electrically isolated from one another and said wiring connector comprises two wiring connectors each for connecting to a respective one of the segments.

5. The outlet of claim 1, wherein said single enclosure comprises flanges for mechanically securing said outlet to a standard in-wall junction box.

6. The outlet of claim 1, wherein:
   said outlet further comprises a standard telephone connector housed in said single enclosure;
   said LAN connector comprises two standard data connectors housed in said single enclosure, each said standard data connector being connectable to a respective data device;
   the wiring includes at least two segments that are electrically isolated from one another and said wiring connector comprises two wiring connectors each for connecting to a respective one of the segments; and
   said single enclosure comprises flanges for mechanically securing said outlet to a standard in-wall junction box.

7. A kit comprising two outlets, each as defined in claim 1, and instructions.

8. The kit of claim 7, wherein each of said outlets is a network outlet.

* * * * *